(12) United States Patent
Satake et al.

(10) Patent No.: US 8,208,100 B2  
(45) Date of Patent: Jun. 26, 2012

(54) LIGHT-SCATTERING FILM, POLARIZING PLATE AND LIQUID CRYSTAL DISPLAY DEVICE

(75) Inventors: Ryo Satake, Minami-Ashigara (JP); Ryuji Saneto, Minami-Ashigara (JP); Hiroyuki Yoneyama, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1069 days.

(21) Appl. No.: 12/054,984

(22) Filed: Mar. 25, 2008

(65) Prior Publication Data

US 2008/0239201 A1    Oct. 2, 2008

(30) Foreign Application Priority Data

Mar. 26, 2007 (JP) ................ P2007-078732

(51) Int. Cl.  
*G02F 1/1335* (2006.01)

(52) U.S. Cl. .......... 349/112; 349/96

(58) Field of Classification Search ............ None  
See application file for complete search history.

(56) References Cited

U.S. PATENT DOCUMENTS

| | | | |
|---|---|---|---|
| 6,217,184 B1* | 4/2001 | Koike et al. | 362/606 |
| 7,310,189 B2* | 12/2007 | Tukker et al. | 359/665 |
| 2003/0214724 A1* | 11/2003 | Fujikawa et al. | 359/630 |
| 2006/0110115 A1* | 5/2006 | Hamamatsu et al. | 385/129 |

FOREIGN PATENT DOCUMENTS

| | | |
|---|---|---|
| JP | 2003-121618 A | 4/2003 |
| JP | 2006-259003 A | 9/2006 |

OTHER PUBLICATIONS

Japanese Office Action, dated Oct. 18, 2011, for Japanese Application No. 2008-076732.

* cited by examiner

*Primary Examiner* — Richard Kim  
(74) *Attorney, Agent, or Firm* — Birch, Stewart, Kolasch & Birch, LLP

(57) ABSTRACT

A light-scattering film includes a support; and a layer including a light-scattering particle and a light-transparent resin, wherein the light-scattering film satisfies following formulae (1) to (3) at the same time:

$n_{B435} < n_{P435}$    Mathematical Formula (1)

$n_{B545} < n_{P545}$    Mathematical Formula (2)

$0.9 < (n_{P435}/n_{B435})/(n_{P545}/n_{B545}) < 1.005$    Mathematical Formula (3)

wherein $n_{P435}$ and $n_{P545}$ represent refractive indexes of the light-scattering particle at wavelengths of 435 nm and 545 nm, respectively, and $n_{B435}$ and $n_{B545}$ represent a refractive indexes of the light-transparent resin at wavelengths of 435 nm and 545 nm, respectively.

12 Claims, No Drawings

LIGHT-SCATTERING FILM, POLARIZING PLATE AND LIQUID CRYSTAL DISPLAY DEVICE

BACKGROUND OF THE INVENTION

1. Field of the Invention

The present invention relates to a light-scattering film, a polarizing plate and a liquid crystal display device. More specifically, the present invention relates to a light-scattering film capable of exhibiting excellent effect of alleviating the viewing-angle asymmetry when used for a display having viewing-angle asymmetry, and at the same time, reducing the change in color tint when mounted on a display; a polarizing plate equipped with the light-scattering film; and an image display device having provided therein the polarizing plate.

2. Description of the Related Art

An image display device typified by a liquid crystal display (LCD), a plasma display panel (PDP), CRT, EL and the like is used in various fields including a television and a computer and shows remarkable growth. Above all, LCD is thin and lightweight and is prominently spreading as a display medium for thin-screen television, cellular phone, personal computer, digital camera, PDA and other various devices.

As for the display mode of LCD, display devices such as TN mode, VA mode, IPS mode and OCB mode have been developed. In these display modes of the liquid crystal display device, the liquid crystal alignment configuration differs and image display characteristics peculiar to respective liquid crystal alignment configurations are exhibited. The TN mode developed in the initial stage and the OCB mode improved in the response speed are revealed to have a problem of viewing-angle brightness asymmetry or viewing-angle color asymmetry, and the viewing angle performance needs to be compensated by a phase difference film or a light-scattering film.

In particular, movement to growth in size of the display device is recently accelerated and the effect of the above-described visual asymmetry on the comfort during use of the display device is becoming serious.

On the other hand, in an optical functional film used for a display member of LCD, PDP and the like, a functional layer according to various uses is stacked on a support such as triacetyl cellulose (TAC) and polyethylene terephthalate (PET). Out of these optical functional films, a light-scattering film of scattering transmitted light of a display and improving the viewing-angle brightness asymmetry inherent in the display is composed of a resin raw material component for forming a light-transparent resin and a light-scattering particle for scattering transmitted light by the effect of difference in the refractive index from the light-transparent resin. The light-scattering film is known to exert a great effect particularly on an image display device having viewing-angle asymmetry, such as OCB mode and TN mode (see, JP-A-2006-259003).

SUMMARY OF THE INVENTION

By the conventional light-scattering film, viewing-angle asymmetry is improved but in terms of viewing-angle color asymmetry, the problem that change in blue tint occurs is not solved.

Considering these problems, an aspect of the present invention is to provide a light-scattering film, a polarizing plate and a liquid crystal display device, particularly, a large-screen display device of 26 inches or more, ensuring that in a display having viewing-angle asymmetry, both the brightness asymmetry and the change in color tint are improved over a wide range of viewing angle.

As a result of intensive studies, the present inventors have found that the above-described problems can be improved by a light-scattering film and a polarizing plate each having the following constructions, and a liquid crystal display device using the polarizing plate.

<1> A light-scattering film comprising:
a support; and
a layer comprising a light-scattering particle and a light-transparent resin,
wherein the light-scattering film satisfies following formulae (1) to (3) at the same time:

$$n_{B435} < n_{P435} \qquad \text{Mathematical Formula (1)}$$

$$n_{B545} < n_{P545} \qquad \text{Mathematical Formula (2)}$$

$$0.9 < (n_{P435}/n_{B435})/(n_{P545}/n_{B545}) < 1.005 \qquad \text{Mathematical Formula (3)}$$

wherein
$n_{P435}$ and $n_{P545}$ represent refractive indexes of the light-scattering particle at wavelengths of 435 nm and 545 nm, respectively, and
$n_{B435}$ and $n_{B545}$ represent a refractive indexes of the light-transparent resin at wavelengths of 435 nm and 545 nm, respectively.

<2> A light-scattering film comprising:
a support; and
a layer comprising a light-scattering particle and a light-transparent resin,
wherein the light-scattering film satisfies a following formula (4):

$$0.33 < T_{435}/T_{545} < 1.25 \qquad \text{Mathematical Formula (4)}$$

wherein
$T_{435}$ and $T_{545}$ represent spectral transmittances at wavelengths of 435 nm and 545 nm, respectively.

<3> The light-scattering film as described in <1>, which further satisfies a following mathematical formula (5):

$$1.005 < n_{B435}/n_{B545} < 1.360. \qquad \text{Mathematical Formula (5)}$$

<4> The light-scattering film as described in <1>, which further satisfies a following formula (4):

$$0.33 < T_{435}/T_{545} < 1.25 \qquad \text{Mathematical Formula (4)}$$

wherein
$T_{435}$ and $T_{545}$ represent spectral transmittances at wavelengths of 435 nm and 545 nm, respectively.

<5> The light-scattering film as described in <1>, wherein the light-transparent resin comprises an aromatic ring.

<6> The light-scattering film as described in <1>, which has a haze value of 15 to 100%.

<7> The light-scattering film as described in <1>, wherein the light-scattering particle comprises a sulfur atom.

<8> The light-scattering film as described in <1>, wherein the light-scattering particle is a metal oxide particle, or the light-scattering particle is a resin particle comprising a metal oxide particle.

<9> A polarizing plate comprising:
the light-scattering film as described in <1>.

<10> A liquid crystal display device comprising:
a TN-mode or OCB-mode liquid crystal cell; and
the polarizing plate as described in <9>.

<11> The liquid crystal display device as described in <10>, which has a panel size of 26 inches or more.

DETAILED DESCRIPTION OF THE INVENTION

The embodiments of the present invention are described below.

<Light-Scattering Film>
[Light-Scattering Layer]

The light-scattering film of the present invention of obtained by stacking a layer containing at least one kind of a light-transparent resin and at least one kind of a light-scattering particle dispersed in the light-transparent resin (hereinafter sometimes referred to as a "light-scattering layer"), on a support film. In the present invention, the light-transparent resin is not limited in the kind of its material, and a thermoplastic resin or a thermosetting resin•ionizing radiation-curable resin may be used by curing it. In the present invention, assuming that the refractive indexes at wavelengths of 435 nm and 545 nm of the light-scattering particle are $n_{P435}$ and $n_{P545}$, respectively, and the refractive indexes at 435 nm and 545 nm of the light-transparent resin are $n_{B435}$ and $n_{B545}$, respectively, the following mathematical formulae (1) to (3) must be satisfied at the same time:

$n_{B435} < n_{P435}$  Mathematical Formula (1)

$n_{B545} < n_{P545}$  Mathematical Formula (2)

$0.9 < (n_{P435}/n_{B435})/(n_{P545}/n_{B545}) < 1.005.$  Mathematical Formula (3)

[Mathematical Formulae (1) to (3)]

Mathematical formulae (1) to (3) are described below.

In the present invention, as shown by mathematical formulae (1) and (2), the refractive index of the light-scattering particle (hereinafter, sometimes referred to as a "light-transparent particle") needs to be higher than the refractive index of the light-transparent resin. By virtue of this difference in the refractive index between these two members, light is scattered at the interface.

The refractive index of the light-transparent resin for use in the present invention is not particularly limited in its numerical value except that the refractive index is lower than the refractive index of the particle, but in the case of using a general-purpose light-transparent resin and a general-purpose particle, the refractive index of the light-transparent resin at a wavelength of 545 nm is preferably from 1.40 to 1.60, more preferably from 1.45 to 1.58, and most preferably from 1.50 to 1.55. Because, although this is described in detail below, if the refractive index is excessively high, the difference in the refractive index from the particle becomes small, whereas if the refractive index of the light-transparent resin is too low, the difference in the refractive index from the particle becomes large and the light-scattering property increases.

The difference in the refractive index between the light-transparent resin and the particle at wavelengths of 435 nm and 545 nm is preferably from 0.02 to 0.20. Because, when the difference in the refractive index is 0.02 or more, a satisfactory light-scattering effect is obtained by virtue of the difference in the refractive index between two members, and when the difference in the refractive index is 0.20 or less, there arises no trouble such as whitening of the entire film due to excessively high light-scattering property. Here, the wavelengths of 435 nm and 545 nm are taken note of because these are wavelengths corresponding to blue and green which are primary colors in the additive color process, and correspond to the wavelengths of primary colors through a backlight typically used in a liquid crystal display device.

In mathematical formula (3), the value of $(n_{P435}/n_{B435})/(n_{P545}/n_{B545})$ (hereinafter referred to as a "K value") indicates the relative relationship between the refractive index ratio of particle and light-transparent resin at the blue wavelength and the refractive index ratio of particle and light-transparent resin at the green wavelength and becomes 1.0 when the refractive index ratio is the same at both wavelengths. As the K value is smaller, scattering of blue light with respect to green light decreases. In the present invention, the K value must be less than 1.005 and is preferably 1.000 or less, more preferably 0.980 or less. Particularly, when the particle diameter of the light-scattering particle is less than 3.0 μm, the blue light component out of light scattering by the particle itself is more likely to increase as compared with the green light component and the K value is preferably smaller than 1.000.

The dependency of the refractive index on the wavelength is called wavelength dispersion and when the wavelength dependency of the refractive index is low, it is said that the wavelength dispersion of the refractive index is small. The wavelength dispersion of the refractive index of a substance generally used for the light-transparent resin or light-scattering particle has the following characteristics.

First, the refractive index of the substance tends to increase as the wavelength becomes shorter.

Secondly, the refractive index of a substance having a higher refractive index is more likely to increase as the wavelength becomes shorter.

Accordingly, in the case of producing a light-scattering film where a light-transparent particle having a relatively high refractive index is dispersed in a light-transparent resin having a relatively low refractive index, generally, the wavelength dispersibility of the refractive index of the light-transparent particle is larger than that of the light-transparent resin and the difference in the refractive index between these two members increases in the short wavelength region. As a result, light scattering of the short wavelength component is increased and the film is liable to cause a phenomenon that the scattered light is blue-tinted. Therefore, when the light-scattering film is disposed on the surface of a liquid crystal display device, the effect of improving the brightness asymmetry may be obtained, but the degree of scattering varies depending on the wavelength and there arises a problem that the change of color tint is large. Particularly, the scattered light has large contribution in a TN or OCB mode causing large brightness asymmetry and when observed from an oblique direction, the above-described phenomenon becomes prominent. Reduction in the change of color tint can be realized by making close the wavelength dispersibility of the refractive index of the light-transparent particle to that of the light-transparent resin and satisfying the mathematical formula (3).

In the present invention, as long as the light-scattering particle and the light-transparent resin satisfy mathematical formulae (1) to (3), any light-scattering particle and any light-transparent resin may be arbitrarily used. The material for the formation of light-scattering layer, which can be used in the present invention, is described later in [Material Used in Light-Scattering Layer]

{Means for Satisfying Mathematical Formulae (3) and (4)}

With respect to the means for satisfying mathematical formulae (3) and (4), the following means (1) and (2) are preferably used individually or in combination. As regards the means for satisfying mathematical formula (4), this can be achieved also by imparting surface scattering due to irregularities on the light-scattering film surface, in addition to satisfying mathematical formula (3).

(1) The wavelength dispersibility of the light-transparent resin is increased to elevate the refractive index at a short wavelength.

(2) The wavelength dispersibility of the light-transparent particle is reduced to decrease the refractive index at a short wavelength.

These means are described below.

(1) Method of Increasing the Wavelength Dispersibility of the Light-Transparent Resin to Elevate the Refractive Index at Short Wavelength The means for increasing the refractive index at a short wavelength of the light-transparent resin is not particularly limited as long as an aromatic group can be imparted to the compound constituting the light-transparent resin, but, for example, a method using a light-transparent resin having an aromatic group in its constitutional unit, and a method of using an aromatic group-containing compound in combination with a light-transparent resin having no aromatic group in the constitutional unit, both may be employed. In the latter case, the method for using an aromatic group-containing compound in combination may be either introduction or addition into the resin side chain by various chemical reactions. In the present invention, a method using a light-transparent resin having an aromatic group in the constitutional unit is preferred, and a method of forming a light-transparent resin by coating and curing a curable resin having an aromatic group within the molecule is more preferred.

Examples of the thermoplastic resin having an aromatic group in the constitutional unit include polyethylene terephthalate (PET), polyethylene naphthalate (PEN), polycarbonate (PC), phenolic resin, furan resin, xylene•formaldehyde resin, melamine resin, aniline resin and aromatic group-containing epoxy resin. Also, a resin comprising a condensate of methylolmelamine as a raw material of melamine resin, or an alcohol-modified product thereof, and a compound having a plurality of hydroxyl groups within the molecule is preferred because the mixing ratio between two components or the selection of the compound having a hydroxyl group has a wide latitude. One of these resins may be used alone, or a plurality thereof may be mixed and used.

The ionizing radiation-curable resin is preferably a polyfunctional monomer or a polyfunctional oligomer in view of increase in the hardness of the cured film. The polymerizable functional group is preferably a photo-, electron beam- or radiation-polymerizable functional group, more preferably a photopolymerizable functional group. Examples of the photopolymerizable functional group include an unsaturated polymerizable functional group such as (meth)acryloyl group, vinyl group, styryl group and allyl group. Among these, a (meth)acryloyl group is preferred.

Out of photopolymerizable monomers having an ethylenically unsaturated group, examples of the monomer having an aromatic group in the constitutional unit include a vinylbenzene derivative (e.g., vinylbenzene, p-tert-butyl vinylbenzene, 1,4-divinylbenzene, 2-acryloylethyl 4-vinylbenzoate, 1,4-divinylcyclohexanone), and an aromatic group-containing (meth)acrylate derivative (e.g., phenyl(meth)acrylate, benzyl(meth)acrylate). Also, an aromatic group-containing polyfunctional monomer having introduced thereinto an acryloyl group through a urethane bond is preferred because of large wavelength dispersion of the refractive index. Examples of the commercially available compound include "Ebecryl-204", "Ebecryl-205", "Ebecryl-210", "Ebecryl-215", "Ebecryl-220", "Ebecryl-6202" and "KRM8098" (all produced by DAICEL-CYTEC Company Ltd.).

Out of the photopolymerizable monomer having an ethylenically unsaturated group, the compound having no aromatic group in the constitutional unit is not particularly limited, but examples thereof include a general-purpose polymerizable monomer such as (meth)acrylic acid and methyl(meth)acrylate, and a polyfunctional monomer such as dipentaerythritol hexaacrylate (DPHA), pentaerythritol tetraacrylate and pentaerythritol triacrylate.

The aromatic group which can be introduced into the compound constituting the light-transparent resin includes a phenyl group, a biphenyl group, a naphthyl group, an anthracenyl group, various condensed rings and various heteroaromatic rings. As for the proportion of the aromatic group introduced, in the case of introducing an aromatic group into the light-sensitive resin, the component ratio of the aromatic monomer unit is preferably from 5 to 40%, more preferably from 10 to 30%, still more preferably from 15 to 20%, based on all monomer units. In the case of adding an aromatic compound, the weight ratio of the aromatic additive is preferably from 5 to 40%, more preferably from 10 to 30%, still more preferably from 15 to 20%, based on the entire solid content. In either method, as the proportion of the aromatic component is higher, the refractive index at a short wavelength is elevated and a preferred result is obtained. However, if the component ratio is less than 5%, the expected effect of elevating the refractive index is small, whereas if the component ratio exceeds 40%, the wavelength dispersibility of the refractive index is excessively increased and scattering of the red component conversely increases, though scattering of the blue component may decrease.

(2) Method of Reducing the Wavelength Dispersibility of the Light-Transparent Particle to Decrease the Refractive Index at a Short Wavelength The means for decreasing the refractive index at a short wavelength of the light-transparent particle is described below.

(2-1) Introduction of Sulfur Atom, Iodine Atom, Bromine Atom or Chlorine Atom

The wavelength dispersion can be reduced despite high refractive index by introducing an atomic group having a high value of [molecular refractive index R/molecular dispersion ΔR] into the compound forming the light-transparent particle. Specifically, introduction of sulfur atom, iodine atom, bromine atom or chlorine atom is effective, and among these atoms, in view of weather resistance, introduction of sulfur atom is preferred. Specific examples of the compound include a thiourethane-based compound obtained by the addition polymerization of a tetrafunctional thiol and an aromatic ring-containing isocyanate.

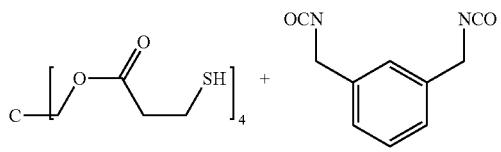

As for the thiol, use of the following compound increased in the sulfur content is also advantageous for reducing the wavelength dispersion.

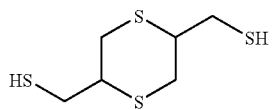

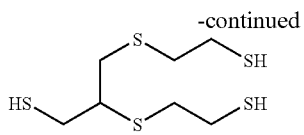

In view of high sulfur content and easy shapability, an aromatic or aliphatic compound having a plurality of episulfide groups within the molecule may be used. Preferably, a compound having the following structure may be used.

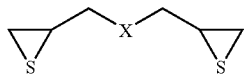

In the formula, —X— represents —S—[(CH$_2$)$_m$—S]$_n$—, wherein m=from 0 to 4 and n=from 0 to 2. By setting m and n to these ranges, a light-scattering film excellent in the handleability and heat resistance and assured of high refractive index and small wavelength dispersion can be obtained.

(2-2) Use of Metal Oxide Particle

In general, the wavelength dispersion of a metal oxide is small as compared with an organic light-transparent resin. Out of the metal oxides, oxides of metal atoms such as zirconium, titanium zinc, aluminum and indium have a high refractive index. In order to obtain the desired light-scattering property, the difference in the refractive index between the light-transparent resin and the light-scattering particle is preferably adjusted to the above-described suitable range. For example, a metal oxide particle or multilayer-structure oxide particle of a mixed crystal containing zirconium and silicon, titanium and silicon, or aluminum and silicon can be formed. The method for forming, for example, a particle using a titanium and silicon is described in JP-A-7-2520, JP-A-2003-252616 and JP-A-2006-52128.

(2-3) Use of Resin Particle Containing Metal Oxide Particle

A resin particle adjusted to a desired refractive index can be used by incorporating a high refractive index metal oxide of zirconium, titanium, zinc, aluminum, indium, hafnium, scandium, lanthanum or the like in a fine particle state of 0.1 μm or less into the resin particle. For example, a zirconium oxide particle having a diameter of about 15 nm, of which surface is hydrophobically modified with a silane coupling agent, is mixed with a radical polymerizable monomer and the mixture is polymerized, whereby a high refractive index light-scattering particle can be formed. As regards the preparation method of the resin particle containing a metal oxide particle, there are known, for example, an emulsion polymerization method, a twin-screw kneading/pulverizing method, and a method by twin-screw kneading and then dissolving. Examples of the resin fine particle containing fine particulate titanium oxide are described in JP-A-2007-277464.

(2-4) Use of Resin Particle Containing Triazine Ring

By using a resin having a triazine ring, despite a high refractive index, the wavelength dispersion can be reduced as compared with the case using a resin having a benzene ring. Examples of the titled resin include a melamine resin and a guanamine resin. Among these, an alkyletherified melamine resin, an acetoguanamine-based resin, a spiroguanamine-based resin and a benzoguanamine-based resin are preferred, and a methylolated melamine-based resin is more preferred.

In the present invention, in order to reduce the wavelength dispersibility of the light-transparent particle to decrease the refractive index at a short wavelength, any one method of (2-1) to (2-3) may be employed. Also, a resin of (2-1) may be used for the resin containing a metal oxide fine particle of (2-3).

In the present invention, the refractive index wavelength dispersion of the light-transparent particle is preferably small and is preferably 1.000<nP435/nP545<1.029, more preferably 1.000<nP435/nP545<1.020. A polystyrene-based polymer is known as a general-purpose light-transparent particle having a high refractive index, but the polystyrene-based resin has a value of nP435/nP545 as high as about 1.031 and its wavelength dispersion property is large. As compared with this, when the methods of (2-1) to (2-4) are used, the wavelength dispersion property can be reduced to the preferred range of the present invention.

One kind of a light-transparent particle may be used or a plurality of kinds of light-transparent particles may be used. In the case of using a plurality of kinds of light-transparent particles, at least one kind of a particle mainly contributes to the light scattering, but other kinds of particles may not contribute to the scattering. Accordingly, in the case of using a plurality of kinds of particles, as for the selection of the particle species, at least one or more kinds of particles are preferably particles coming under (2-1) to (2-4), though the particle species are not limited to the classification of (2-1) to (2-4) above. In particular, a light-transparent particle having introduced thereinto sulfur atom, iodine atom, bromine atom or chlorine atom of (2-1) or the resin particle containing triazine ring of (2-4) is preferably used, because the specific gravity of the light-transparent particle is relatively small and precipitation of the particle in the coating solution less occurs.

In the present invention, the means (1) of increasing the wavelength dispersion of the light-transparent resin and the means (2) of reducing the wavelength dispersion of the light-transparent particle may be used individually, or both may be used in combination.

[Mathematical Formula (4)]

The spectral transmittance, which is a rate at which a substance does not scatter and absorb light but transmits the light, varies depending on the wavelength of light and is usually measured as a spectral transmission spectrum. In the case of the light-scattering layer formed of a light-transparent resin having dispersed therein a light-scattering particle, the spectral transmission spectrum in the visible light region varies depending on the material, shape and size of the particle. In the present invention, it is preferred to satisfy the following mathematical formula (4):

$$0.33 < T_{435}/T_{545} < 1.25 \qquad \text{Mathematical Formula (4)}$$

As the value (K value) of (T$_{435}$/T$_{545}$) is smaller, light scattering of the blue component is large and the light vertically transmitted through the film takes on a yellow-to-red tint. On the other hand, when the above-described value is large, light scattering of the blue component is small and the light vertically transmitted through the film appears with a blue tint. Accordingly, in the present invention, the ratio T$_{435}$/T$_{545}$ between the transmittance T$_{435}$ at a wavelength of 435 nm and the transmittance T$_{545}$ at a wavelength of 545 nm is preferably in the range of 0.33 to 1.25, more preferably from 0.40 to 1.11, and most preferably from 0.66 to 1.00.

In the present invention, it is preferable that the wavelength dispersibility of the refractive index of the light-transparent resin satisfies mathematical formula (5):

$$1.005 < n_{B435}/n_{B545} < 1.360 \qquad \text{Mathematical Formula (5)}$$

Here, if the evaluation value above is 1.005 or less, the refractive index ratio to the particle in the short wavelength region becomes large and the change to a blue tint of the transmitted light increases when mounted on a display device, whereas if the evaluation value is 1.360 or more, the refractive index ratio to the particle in the short wavelength region becomes small and the change to a red tint of the transmitted light increases. Accordingly, when the evaluation value is in the range of mathematical formula (5), a light-scattering film having a highest effect of improving the visual sense can be obtained.

Also, in the present invention, it is particularly preferred to satisfy mathematical formulae (1) to (3) and at the same time, satisfy mathematical formula (5). When mathematical formulae (1) to (3) are satisfied and at the same time, mathematical formula (5) is satisfied, the light-transparent resin and the particle both are reduced in the wavelength dispersibility of the refractive index and at the same time, the wavelength dependency of the refractive index ratio therebetween lowers. As a result, the light-scattering property every each wavelength becomes nearly neutral and a light-scattering film capable of optimally controlling the change in the color tinting of a display device can be obtained.

In order to enhance the display quality (improve the viewing angle) of an image display device by a light-scattering film, appropriately entered light needs to be appropriately diffused.

As the diffusing effect is larger, the viewing angle characteristics are enhanced. On the other hand, in view of display quality, for maintaining the brightness at the front, the transmittance needs to be increased as much as possible.

In the present invention, for obtaining appropriate scattering property, the particle diameter of the light-scattering particle is preferably from 0.5 to 6.0 μm, more preferably from 0.6 to 5.0 μm, and most preferably from 0.7 to 4.0 μm. By using a particle having a particle diameter in this range, an angle distribution of light scattering suitable for the present invention is obtained. When the particle diameter is 0.5 μm or more, an appropriate light-scattering effect is obtained and not only the viewing angle characteristics are good but also back scattering is appropriately suppressed to decrease the reduction in the brightness. On the other hand, when the particle diameter is 6.0 μm or less, there is not caused such a problem that the light-scattering effect becomes small and the viewing angle characteristics are less enhanced. If the size of the light-scattering particle is less than 3.0 μm, the wavelength dependency of light scattering by the particle itself tends to increase and scattering of light at a short wavelength is intensified. In this region, it is particularly important that the relationship (K value) between the light-transparent resin and the light-scattering particle in terms of the wavelength dispersion of the refractive index makes light at a short wavelength to be less scattered. Accordingly, the K value is preferably below 1.0.

In the present invention, the shape of the light-scattering particle is not particularly limited and may take various shapes such as spherical flat or spindle-like but is preferably spherical.

The appropriate scattering property can be specified by a haze value. If the haze value is too low, a satisfactory effect of improving the viewing angle cannot be obtained, whereas if the haze value is excessively high, brightness at the front decreases. Accordingly, the haze value of the light-scattering film is preferably from 15 to 100%, more preferably from 30 to 80%, and most preferably from 40 to 65%. In the present invention, when the haze value is from 15 to 100%, the light-scattering film can be said to have appropriate scattering property.

[Materials Use in Light-Scattering Layer]

The materials which can be used in the light-scattering layer of the present invention are described below.

(Light-Transparent Resin)

The light-transparent resin for use in the present invention is not particularly limited in the kind of its material as long as mathematical formula (1) to (3) are satisfied in relation to the light-scattering particle, and a thermoplastic resin, a thermosetting resin or an ionizing radiation-curable resin may be appropriately used.

By reducing the wavelength dispersibility of the light-transparent particle by the means (2) above, it becomes possible to use the following resins.

As for the thermoplastic resin, various resins such as polymethyl methacrylate (PMMA), polyethylene (PE), polypropylene (PP), polyvinyl alcohol (PVA), polyvinyl chloride (PVC), cycloolefin copolymer (COC), norbornene-containing resin and polyether sulfone may be used. These may be used individually or as a mixture of a plurality of species thereof.

Examples of the thermosetting resin include furan resin, ketone•formaldehyde resin, urea resin, aniline resin, alkyd resin, unsaturated polyester resin and epoxy resin.

These may be used individually or as a mixture of a plurality of species thereof.

The ionizing radiation-curable resin is preferably a polyfunctional monomer or a polyfunctional oligomer in view of increase in the hardness of the cured film. The polymerizable functional group is preferably a photo-, electron beam- or radiation-polymerizable functional group, more preferably a photopolymerizable functional group. Examples of the photopolymerizable functional group include an unsaturated polymerizable functional group such as (meth)acryloyl group, vinyl group, styryl group and allyl group. Among these, a (meth)acryloyl group is preferred.

Examples of the photopolymerizable monomer having two or more ethylenically unsaturated groups include an ester of polyhydric alcohol and (meth)acrylic acid {e.g., ethylene glycol di(meth)acrylate, 1,4-cyclohexanediol diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, polyester polyarylate}, a vinylsulfone (e.g., divinylsulfone), and a (meth)acrylamide (e.g., methylenebisacrylamide). Among these, an acrylate or methacrylate monomer having at least three functional groups is preferred, and an acrylate monomer having at least five functional groups is more preferred in view of film hardness, that is, scratch resistance. A mixture of dipentaerythritol pentaacrylate and dipentaerythritol hexaacrylate is commercially available and is preferably used.

Also, a polyfunctional monomer having introduced thereinto an acryloyl group through a urethane bond is preferred because of large wavelength dispersion of the refractive index. As for the commercially available product, aliphatic or aromatic urethane acrylates of "Ebecryl" series produced by DAICEL-CYTEC Company Ltd. are preferred.

In place of the monomer having a polymerizable unsaturated group or in addition to the monomer having a polymerizable unsaturated group, a crosslinking functional group may be introduced into the binder. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane, and a metal alkoxide such as tetramethoxysilane can be used as a monomer having a crosslinked structure. A functional group which exhibits the crosslinking property as a result of decomposition reaction, such as block isocyanate group, may also be used. In other words, the crosslinking functional group for use in the present invention may be a group which does not directly cause a reaction but exhibits reactivity as a result of decomposition. The binder having such a crosslinking functional group is coated and then heated, whereby a crosslinked structure can be formed.

(Light-Scattering Particle)

In the present invention, the light-scattering particle which can be used is not limited as long as the difference in the refractive index from the light-transparent resin takes the above-described numerical value. By increasing the wavelength dispersion of the light-transparent resin by the means (1) above, it becomes possible to use the following general-purpose particles.

In the present invention, the light-scattering particle may be a monodisperse organic fine particle or a monodisperse inorganic fine particle. As the particle diameter is less dispersed, fluctuation in the light-scattering property decreases and the design of the light-scattering film becomes easy. The light-transparent fine particle is preferably a plastic bead, and a plastic bead having high transparency and giving the above-described numerical value as the difference in the refractive index from the light-transparent resin is more preferred.

Examples of the organic fine particle which is used include a polymethyl methacrylate bead (refractive index: 1.49), an acryl-styrene copolymer bead (refractive index: 1.54), a melamine formaldehyde bead (refractive index: 1.65), a polycarbonate bead (refractive index: 1.57), a styrene bead (refractive index: 1.60), a crosslinked polystyrene bead (refractive index: 1.61), a polyvinyl chloride bead (refractive index: 1.60), and a benzoguanamine-melamine formaldehyde bead (refractive index: 1.68). The light-transparent fine particle is suitably contained in an amount of 5 to 30 parts by mass per 100 parts by mass of the light-transparent resin.

(Inorganic Filter)

In the case of the above-described light-transparent fine particle, the light-transparent fine particle readily precipitates in the resin composition (light-transparent resin) and therefore, for preventing the precipitation, an inorganic filler such as silica may be added. Incidentally, as the amount of the inorganic filler added is larger, this is effective for preventing the precipitation of the light-transparent fine particle but causes an adverse effect on the transparency of the film coating. Accordingly, an inorganic filler having a particle diameter of 0.5 μm or less is preferably contained in the light-transparent resin in an amount of less than 0.1 mass % to an extent of not impairing the transparent of the film coating.

(Photopolymerization Initiator)

In the coating solution used for producing any layer on the support, a photopolymerization initiator for curing the light-transparent resin by the irradiation of light is preferably added. In the present invention, a photoradical polymerization initiator is preferably used as the photo-initiator.

Examples of the photoradical polymerization initiator include acetophenones, benzoins, benzophenones, phosphine oxides, ketals, anthraquinones, thioxanthones, azo compounds, peroxides (see, for example, JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins.

These initiators may be used individually or as a mixture. Various examples are also described in *Saishin UV Koka Gijutsu* (*Newest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), and these are useful in the present invention.

Preferred examples of the commercially available photoradical polymerization initiator include "KAYACURE (e.g., DETX-S, BP-100, BDMK, CTX, BMS, 2-EAQ, ABQ, CPTX, EPD, ITX, QTX, BTC, MCA)" produced by Nippon Kayaku Co., Ltd.; "Irgacure (e.g., 651, 184, 500, 819, 907, 369, 1173, 1870, 2959, 4265, 4263)" produced by Ciba Specialty Chemicals Corp.; "Esacure (KIP100F, KB1, EB3, BP, X33, KT046, KT37, KIP150, TZT)" produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

(Surface State Improver)

In the coating solution used for producing any layer on the support, at least either a fluorine-based surface state improver or a silicone-based surface state improver is preferably added so as to improve the surface state failure (e.g., coating unevenness, drying unevenness, point defect).

The surface state improver preferably changes the surface tension of the coating solution by 1 mN/m or more. Here, when the surface tension of the coating solution is changed by 1 mN/m or more, this means that the surface tension of the coating solution after the addition of the surface state improver, including the concentration process at the coating/drying, is changed by 1 mN/m or more as compared with the surface tension of the coating solution where the surface state improver is not added. A surface state improver having an effect of reducing the surface tension of the coating solution by 1 mN/m or more is preferred, a surface state improver reducing the surface tension by 2 mN/m or more is more preferred, and a surface state improve reducing the surface tension by 3 mN/m or more is still more preferred.

Preferred examples of the fluorine-based surface state improver include a compound having a fluoroaliphatic group. Preferred examples of the compound include compounds described in JP-A-2005-115359, JP-A-2005-221963 and JP-A-2005-234476.

(Coating Solvent)

As for the solvent used in the coating composition for forming each layer of the present invention, various solvents selected, for example, from the standpoint whether the solvent can dissolve or disperse each component, readily provides a uniform surface state in the coating step and drying step, can ensure liquid storability or has an appropriate saturated vapor pressure, may be used.

Two or more kinds of solvents may be mixed and used. In view of the drying load, it is preferred that a solvent having a boiling point of 100° C. or less at room temperature under atmospheric pressure is used as the main component and a small amount of a solvent having a boiling point of 100° C. or more is contained for adjusting the drying speed.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5°

C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (same as methyl ethyl ketone, 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); and carbon disulfide (46.2° C.). Among these, ketones and esters are preferred, and ketones are more preferred. Out of ketones, 2-butanone is preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethyl sulfoxide (189° C.). Among these, cyclohexanone and 2-methyl-4-pentanone are preferred.

[Formation Method of Light-Scattering Layer]

The light-scattering layer may be formed by any method as long as mathematical formulae (1) to (3) are satisfied or mathematical formula (4) is satisfied. The light-scattering layer can be formed by the following coating methods, but the present invention is not limited to these methods.

A known method such as dip coating method, air knife coating method, curtain coating method, roller coating method, wire bar coating method, gravure coating method, extrusion coating method (die coating method) (see, U.S. Pat. No. 2,681,294) and microgravure coating method, is used. Among these, a microgravure coating method and a die coating method are preferred.

The microgravure coating method for use in the present invention is a coating method characterized in that a gravure roll having a diameter of about 10 to 100 mm, preferably from about 20 to 50 mm, and having a gravure pattern engraved on the entire circumference is rotated below the support in the direction reverse to the support-conveying direction and at the same time, a surplus coating solution is scraped off from the surface of the gravure roll by a doctor blade, whereby a constant amount of the coating solution is transferred to and coated on the bottom surface of the support at the position where the top surface of the support is in a free state. A roll-form transparent support is continuously unrolled and on one side of the unrolled support, the light-scattering layer can be coated by the microgravure coating method.

With respect to the conditions for the coating by the microgravure coating method, the number of lines in the gravure pattern engraved on the gravure roll is preferably from 50 to 800 lines/inch, more preferably from 100 to 300 lines/inch, the depth of the gravure pattern is preferably from 1 to 600 µm, more preferably from 5 to 200 µm, the rotation number of the gravure roll is preferably from 3 to 800 rpm, more preferably from 5 to 200 rpm, and the support conveying speed is preferably from 0.5 to 100 m/min, more preferably from 1 to 50 m/min.

In order to supply the film of the present invention with high productivity, an extrusion method (die coating method) is preferably used. This method can be preferably used particularly in a region where the wet coated amount is small (20 cm$^3$/m$^2$ or less), such as hardcoat layer or antireflection layer.

[Other Physical Values of Light-Scattering Layer]

The thickness of the light-scattering layer is not particularly limited as long as it is a thickness large enough to realize appropriate scattering property and hold the product suitability as a film. More specifically, if the layer thickness is too small, scattering property is insufficient and a satisfactory effect of improving the visual sense cannot be obtained, whereas if the layer thickness is too large, serious curling may be involved. Accordingly, the thickness of the light-scattering layer in the present invention is preferably from 3 to 15 µm, more preferably from 4 to 12 µm, still more preferably from 5 to 10 µm.

In the present invention, the light-scattering film may be imparted with antiglare property by creating irregularities on the film surface. In order to obtain a clear surface for the purpose of maintaining the sharpness of an image, out of the characteristics indicating the surface roughness, for example, the centerline average roughness (Ra) is preferably made to be 0.08 µm or less. Ra is more preferably 0.07 µm or less, still more preferably 0.06 µm.

[Layer Construction of Light-Scattering Film]

The constituent layers which can be added in the light-scattering film of the present invention are described below.

In the light-scattering film of the present invention, a functional group as needed according to the purpose may also be provided, in addition to the light-scattering layer.

One preferred embodiment includes an antireflection layer stacked on the support having thereon a light-scattering layer by taking into consideration, for example, the refractive index, film thickness, number of layers, and order of layers, such that the refractive index decreases by the effect of optical interference. Incidentally, in the context of the present invention, the antireflection layer is referred to for collectively indicating the high refractive layer, the medium refractive layer and the low refractive index layer.

The simplest construction of the antireflection layer is a construction where only a low refractive index layer is provided by coating on a support having thereon a light-scattering layer. In order to more reduce the reflectance, the antireflection layer is preferably constituted by combining a high refractive index layer having a refractive index higher than that of the light-scattering layer and a low refractive index layer having a refractive index lower than that of the light-scattering layer. Examples of the construction include a two-layer construction composed of light-scattering layer/high refractive index layer/low refractive index layer from the support side, and a construction formed by stacking three layers differing in the refractive index in the order of a medium refractive index layer (a layer having a refractive index higher than that of the support, the light-scattering layer or the hardcoat layer but lower than that of the high refractive index layer)/a high refractive index layer/a low refractive index layer. A construction where a larger number of antireflection layers are stacked is also proposed. Above all, in view of durability, optical property, cost, productivity and the like, the antireflection layer is preferably coated on a support having thereon a hardcoat layer and a light-scattering layer, in the order of a medium refractive index layer/a high refractive index layer/a low refractive index layer. Examples thereof include constructions described in JP-A-8-122504, JP-A-8-110401, JP-A-10-300902, JP-A-2002-243906 and JP-A-2000-111706.

Other functions may also be imparted to each layer, and examples thereof include an antifouling low refractive index layer and an antistatic high refractive index layer (see, for example, JP-A-10-206603 and JP-A-2002-243906).

Preferred examples of the layer construction for the light-scattering film having an antireflection layer of the present invention are set forth below. The antireflection light-scattering film of the present invention is not limited only to these layer constructions if the reflectance can be reduced by optical interference. In the following constructions, it is also possible to impart an antiglare function to the light-scattering layer.

Support film/light-scattering layer/low refractive index layer
Support film/light-scattering layer/antistatic layer/low refractive index layer
Support film/hardcoat layer/light-scattering layer/low refractive index layer
Support film/hardcoat layer/light-scattering layer/antistatic layer/low refractive index layer
Support film/hardcoat layer/antistatic layer/light-scattering layer/low refractive index layer
Support film/light-scattering layer/high refractive index layer/low refractive index layer
Support film/light-scattering layer/antistatic layer/high refractive index layer/low refractive index layer
Support film/light-scattering layer/medium refractive index layer/high refractive index layer/low refractive index layer
Support film/light-scattering layer/high refractive index layer/low refractive index layer
Antistatic layer/support film/light-scattering layer/medium refractive index layer/high refractive index layer/low refractive index layer
Support film/antistatic layer/light-scattering layer/medium refractive index layer/high refractive index layer/low refractive index layer
Antistatic layer/support film/light-scattering layer/medium refractive index layer/high refractive index layer/low refractive index layer
Antistatic layer/support film/light-scattering layer/high refractive index layer/low refractive index layer/high refractive index layer/low refractive index layer Another preferred embodiment is a light-scattering film where layers necessary for imparting hardcoat property, moisture-proof property, gas-barrier property, antiglare property, antifouling property and the like are provided without aggressively using optical interference.

Preferred examples of the layer construction for the film in the above-described embodiment are set forth below.

Support film/light-scattering layer/hardcoat layer
Support film/light-scattering layer
Support film/light-scattering layer/antiglare layer
Support film/hardcoat layer/light-scattering layer
Support film/light-scattering layer/hardcoat layer
Support film/antistatic layer/light-scattering layer
Support film/moisture-proof layer/light-scattering layer
Support film/gas-barrier film/light-scattering layer
Support film/light-scattering layer/antifouling layer
Antistatic layer/support film/light-scattering layer
Light-scattering layer/support film/antistatic layer These layers can be formed by vapor deposition, atmospheric plasma, coating and the like. In view of productivity, these layers are preferably formed by coating.

Each constituent layer is described below.

[Hardcoat Layer]

In the film of the present invention, a hardcoat layer can be preferably provided on one surface of the transparent support so as to impart physical strength to the film. The hardcoat layer may be composed of a stack of two or more layers.

For obtaining an antireflection light-scattering film, in view of optical design, the refractive index of the hardcoat layer for use in the present invention is preferably from 1.48 to 2.00, more preferably from 1.52 to 1.90, still more preferably from 1.55 to 1.80. In the preferred embodiment of the present invention where at least one low refractive index layer is present on a hardcoat layer, when the refractive index is not less than the lower limit above, the antireflection property is enhanced, and when it is not more than the upper limit above, color tint of reflected light is not intensified.

From the standpoint of imparting satisfactory durability and impact resistance to the film, the thickness of the hardcoat layer is usually on the order of 0.5 to 50 μm, preferably from 1 to 20 μm, more preferably from 2 to 10 μm, and most preferably from 3 to 7 μm.

The surface hardness of the hardcoat layer is preferably H or more, more preferably 2H or more, and most preferably 3H or more, in the pencil hardness test. Furthermore, in the Taber test according to JIS K-5400, the abrasion loss of the specimen between before and after test is preferably smaller.

The hardcoat layer is preferably formed through a crosslinking or polymerization reaction of an ionizing radiation-curable compound, similarly to the light-scattering layer. For example, a coating composition containing an ionizing radiation-curable polyfunctional monomer or polyfunctional oligomer is coated on a transparent support, and a crosslinking or polymerization reaction of the polyfunctional monomer or polyfunctional oligomer is brought about, whereby the hardcoat layer can be formed.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

For the purpose of controlling the refractive index of the hardcoat layer, a high refractive index monomer, an inorganic fine particle or both may be added to the binder of the hardcoat layer. The inorganic fine particle has an effect of suppressing curing shrinkage ascribable to the crosslinking reaction, in addition to the effect of controlling the refractive index. In the present invention, a polymer which is produced by polymerizing the above-described polyfunctional monomer and/or high refractive index monomer or the like after the formation of the hardcoat layer is referred to as a binder, including the inorganic particle dispersed therein.

In the case of imparting an antiglare function by the use of surface scattering of the hardcoat layer, the surface haze is preferably from 5 to 15%, more preferably from 5 to 10%.

[Antiglare Layer]

The antiglare layer is formed for the purpose of imparting an antiglare property by the effect of surface scattering and preferably enhancing the scratch resistance of the film.

Known examples of the method for imparting antiglare property include a method of forming the antiglare layer by laminating a mat shaped film having fine irregularities on its surface described in JP-A-6-16851; a method of forming the antiglare layer by bringing about curing shrinkage of an ionizing radiation-curable resin due to difference in the irradiation dose of ionizing radiation described in JP-A-2000-206317; a method of decreasing through drying the weight ratio of good solvent to the light-transparent resin and thereby gelling and solidifying light-transparent fine particle and light-transparent resin to form irregularities on the film coating surface described in JP-A-2000-338310; a method of imparting surface irregularities by applying an external pressure described in JP-A-2000-275404; and a method of forming surface irregularities by utilizing phase separation which occurs in the process of a solvent vaporizing from a mixed solution comprising a plurality of polymers described in JP-A-2005-195819. These known methods can be utilized.

[High Refractive Index Layer, Medium Refractive Index Layer]

In the antireflection light-scattering film which is preferred in the present invention, when a high refractive index layer and a medium refractive index layer are provided and optical interference is utilized together with a low refractive index layer described later, the antireflection property can be enhanced.

In the following context of the present invention, these high refractive index layer and medium refractive index layer are sometimes collectively referred to as a high refractive index layer. Incidentally, in the present invention, the terms "high", "medium" and "low" in the high refractive index layer, medium refractive index layer and low refractive index indicate the relative size of the refractive index among layers. In terms of relationship with the transparent support, the refractive indexes preferably satisfy the relationships of transparent support>low refractive index layer, and high refractive index layer>transparent support.

For producing an antireflection light-scattering film by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

In the case of producing an antireflection light-scattering film by providing a medium refractive index layer, a high refractive index layer and a low refractive index layer in the order closer to the support, the refractive index of the high refractive index layer is preferably from 1.65 to 2.40, more preferably from 1.70 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80.

The medium refractive index layer and high refractive index layer are preferably formed by applying a coating composition containing an inorganic particle for making large the refractive index of the layer formed, a binder and a solvent for forming the matrix, and, if desired, a polymerization initiator, drying the solvent, and curing the coating by either one or both of heating and ionizing radiation irradiation. In the case of using a curable resin or an initiator, the medium refractive index layer or high refractive index layer can be formed by curing the curable resin through a polymerization reaction by the effect of heat and/or ionizing radiation after coating.

Specific examples of the inorganic particle for use in the high refractive index layer or medium refractive index layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are preferred in view of increasing the refractive index. It is also preferred to subject the surface of the inorganic filler to a silane coupling treatment or a titanium coupling treatment. A surface treating agent having a functional group capable of reacting with the binder species on the filler surface is preferably used.

The medium refractive index layer can be prepared in the same manner by using the same materials as the high refractive index layer except that the refractive index is different, and therefore, the high refractive index layer is particularly described below.

The content of the inorganic particle in the high refractive index layer is preferably from 10 to 90 mass %, more preferably from 15 to 80 mass %, still more preferably from 15 to 75 mass %, based on the mass of the high refractive index layer.

Two or more kinds of inorganic particles may be used in combination in the high refractive index layer.

In the present invention, for elevating the refractive index of the high refractive index layer, in addition to use of a high refractive index inorganic particle, a binder obtained by a crosslinking or polymerization reaction, for example, of an aromatic ring-containing ionizing radiation-curable compound, an ionizing radiation-curable compound containing a halogen element (e.g., Br, I, Cl) except for fluorine, or an ionizing radiation-curable compound containing an atom such as S, N and P may also be preferably used.

In the case of having a low refractive index layer on the high refractive index layer, the refractive index of the high refractive index layer is preferably higher than the refractive index of the transparent support.

The thickness of the high refractive index layer may be appropriately designed according to the usage. In the case of using the high refractive index layer as an optical interference layer described later, the thickness is preferably from 30 to 200 nm, more preferably from 50 to 170 nm, still more preferably from 60 to 150 nm.

In the case of not containing a particle imparting an antiglare function, the haze of the high refractive index layer is preferably lower. The haze is preferably 5% or less, more preferably 3% or less, still more preferably 1% or less. The high refractive index layer is preferably formed on the transparent support directly or through another layer.

[Low Refractive Index Layer]

A low refractive index layer is preferably used for reducing the reflectance of the film of the present invention.

The refractive index of the low refractive index layer is preferably from 1.20 to 1.46, more preferably from 1.25 to 1.46, still more preferably from 1.30 to 1.40.

The thickness of the low refractive index layer is preferably from 50 to 200 nm, more preferably from 70 to 100 nm.

The haze of the low refractive index layer is preferably 3% or less, more preferably 2% or less, and most preferably 1% or less.

The surface strength of the low refractive index layer is specifically, in the pencil hardness test with a load of 500 g, preferably H or more, more preferably 2H or more, and most preferably 3H or more.

Also, in order to improve the antifouling performance of the antireflection light-scattering film which is a preferred embodiment of the present invention, the contact angle for water on the surface is preferably 90° or more, more preferably 95° or more, still more preferably 100° or more.

The low refractive index is preferably formed using a curing material which is cured by heating, ionizing radiation irradiation or both means. In the case of using a curable resin or an initiator, the low refractive index layer can be formed by curing the curable resin through a polymerization reaction by the effect of heat and/or ionizing radiation after coating.

The preferred embodiment of the curing material composition includes, for example, (1) a composition containing a fluorine-containing polymer having a crosslinking or polymerizable functional group, (2) a composition mainly comprising a hydrolysis condensate of a fluorine-containing organosilane compound, and (3) a composition containing a monomer having two or more ethylenically unsaturated groups and an inorganic fine particle having a hollow structure.

(1) Composition Containing Fluorine-Containing Polymer having Crosslinking or Polymerizable Functional Group The fluorine-containing polymer having a crosslinking or polymerizable functional group includes a copolymer of a fluorine-containing monomer with a monomer having a crosslinking or polymerizable functional group. Examples of the fluorine-containing monomer include fluoroolefins (e.g., fluoroethylene, vinylidene fluoride, tetrafluoroethylene, hexafluoropropylene, hexafluoropropylene, perfluoro-2,2-dimethyl-1,3-dioxol), partially or completely fluorinated alkyl ester derivatives of (meth)acrylic acid {e.g., "Viscoat 6FM" produced by Osaka Organic Chemical Industry Ltd., "M-2020" produced by Daikin Industries, Ltd.}, and completely or partially fluorinated vinyl ethers.

One embodiment of the monomer for imparting a crosslinking group is a (meth)acrylate monomer previously having a crosslinking functional group in the molecule, such as glycidyl methacrylate. Another embodiment is a method where a fluorine-containing copolymer is synthesized using a monomer having a functional group such as hydroxyl group and thereafter, a monomer for modifying the substituent to introduce a crosslinking or polymerizable functional group is further used. Examples of the monomer include a (meth)acrylate monomer having a carboxyl group, a hydroxyl group, an amino group, a sulfonic acid group or the like {for example, (meth)acrylic acid, methylol(meth)acrylate, hydroxylalkyl(meth)acrylate and allyl acrylate}. The latter embodiment is disclosed in JP-A-10-25388 and JP-A-10-147739.

The fluorine-containing copolymer may contain an appropriate copolymerizable component in view of solubility, dispersibility, coatability, antifouling property and antistatic property. Particularly, for imparting antifouling property and slipperiness, silicone is preferably introduced and this may be introduced into both the main chain and the side chain.

Examples of the method for introducing a polysiloxane partial structure into the main chain include a method using a polymer-type initiator such as azo group-containing polysiloxane amide {as the commercial product, "VPS-0501 and VPS-1001" (trade names), produced by Wako Pure Chemicals Industries, Ltd.} described in JP-A-6-93100. Examples of the method for the introduction into the side chain include a method of introducing a polysiloxane having a reactive group at one terminal {for example, "Silaplane" series produced by Chisso Corp.} by a polymer reaction described in *J. Appl. Polym. Sci.*, Vol. 2000, page 78 (1955) and JP-A-56-28219; and a method of polymerizing a polysiloxane-containing silicon macromer. Both methods may be preferably used.

With the polymer above, as described in JP-A-2000-17028, a curing agent having a polymerizable unsaturated group may be appropriately used in combination. Also, as described in JP-A-2002-145952, combination use with a compound having a fluorine-containing polyfunctional polymerizable unsaturated group is preferred. Examples of the compound having a polyfunctional polymerizable unsaturated group include the above-described monomer having two or more ethylenically unsaturated groups. A hydrolysis condensate of organosilane described in JP-A-2004-170901 is also preferred, and a hydrolysis condensate of organosilane containing a (meth)acryloyl group is more preferred. These compounds are preferred particularly when a compound having a polymerizable unsaturated group is used for the polymer body, because the combination use is greatly effective for the improvement of scratch resistance.

In the case where the polymer itself does not have sufficiently high curability by itself, necessary curability can be imparted by blending a crosslinking compound. For example, when the polymer body contains a hydroxyl group, various amino compounds are preferably used as the curing agent. The amino compound used as the crosslinking compound is a compound containing two or more groups in total of either one or both of a hydroxyalkylamino group and an alkoxyalkylamino group, and specific examples thereof include a melamine-based compound, a urea-based compound, a benzoguanamine-based compound and a glycoluril-based compound. For the curing of such a compound, an organic acid or a salt thereof is preferably used.

Specific examples of the fluorine-containing copolymer described above are described in JP-A-2003-222702 and JP-A-2003-183322.

(2) Composition Mainly Comprising Hydrolysis Condensate of Fluorine-Containing Organosilane Compound The composition mainly comprising a hydrolysis condensate of a fluorine-containing organosilane compound is also preferred because of low refractive index and high hardness of the film coating surface. A condensate of a compound containing a hydrolyzable silanol at one terminal or both terminals with respect to the fluorinated alkyl group and a tetraalkoxysilane is preferred. Specific examples of the composition are described in JP-A-2002-265866 and Japanese Patent 317,152.

(3) Composition Containing Monomer having Two or More Ethylenically Unsaturated Groups and Inorganic Fine Particle having Hollow Structure A still another preferred embodiment is a low refractive index layer comprising a low refractive index particle and a binder. The low refractive index particle may be either organic or inorganic, but a particle having a cavity in the inside thereof is preferred. Specific examples of the hollow particle include a silica-based particle described in JP-A-2002-79616. The refractive index of the particle is preferably from 1.15 to 1.40, more preferably from 1.20 to 1.30. The binder includes the monomer having two or more ethylenically unsaturated groups described above in the paragraph of Light-Diffusing Layer.

In the low refractive index layer according to a preferred embodiment of the present invention, a polymerization initiator described above in the paragraph of Light-Scattering Layer is preferably added. In the case of containing a radical polymerizable compound, the polymerization initiator can be used in an amount of 1 to 10 parts by mass, preferably from 1 to 5 parts by mass, based on the compound.

In the low refractive index layer for use in the present invention, an inorganic particle can be used in combination. In order to impart scratch resistance, a fine particle having a particle diameter corresponding to 15 to 150%, preferably from 30 to 100%, more preferably from 45 to 60%, of the thickness of the low refractive index layer may be used.

In the low refractive index layer for use in the present invention, a known polysiloxane-based or fluorine-based antifouling agent, slipping agent or the like may be appropriately added for the purpose of imparting properties such as antifouling property, water resistance, chemical resistance and slipperiness.

[Antistatic Layer]

In the present invention, an antistatic layer is preferably provided from the standpoint of preventing electrostatic charge on the film surface. Examples of the method for forming the antistatic layer include conventionally known methods such as a method of coating an electrically conductive coating solution containing an electrically conductive fine particle and a reactive curable resin, and a method of vapor-depositing or sputtering a transparent film-forming metal or metal oxide or the like to form an electrically conductive thin film. The antistatic layer may be formed on the support directly or through a primer layer ensuring firm adhesion to the support. Also, the antistatic layer may be used as a part of the antireflection layer. In this case, when the antistatic layer is used as a layer closer to the outermost surface layer, sufficiently high antistatic property can be obtained even if the layer thickness is small.

The thickness of the antistatic layer is preferably from 0.01 to 10 μm, more preferably from 0.03 to 7 μm, still more preferably from 0.05 to 5 μm. The surface resistance of the antistatic layer is preferably from $10^5$ to $10^{12}$ Ω/sq, more preferably from $10^5$ to $10^9$ Ω/sq, and most preferably from $10^5$ to $10^8$ Ω/sq. The surface resistance of the antistatic layer can be measured by a four-probe method.

It is preferred that the antistatic layer is substantially transparent. To speak specifically, the haze of the antistatic layer is preferably 10% or less, more preferably 5% or less, still more preferably 3% or less, and most preferably 1% or less. The transmittance for light at a wavelength of 550 nm is preferably 50% or more, more preferably 60% or more, still more preferably 65% or more, and most preferably 70% or more.

The antistatic layer for use in the present invention is preferably excellent in the surface strength. Specifically, the surface strength of the antistatic layer is, in terms of the pencil hardness with a load of 1 kg, preferably H or more, more preferably 2H or more, still more preferably 3H or more, and most preferably 4H or more.

[Coating Solvent]

Out of these constituent layers, the layer coated in adjacency to the support film preferably contains at least one or more kinds of a solvent capable of dissolving the support film and at least one or more kinds of a solvent incapable of dissolving the support film. By virtue of such an embodiment, excessive penetration of the adjacent layer component into the support film can be prevented and at the same time, the adhesion between the adjacent layer and the support film can be ensured. Furthermore, at least one kind of a solvent out of the solvents capable of dissolving the support film preferably has a boiling point higher than the boiling point of at least one kind of a solvent out of the solvents incapable of dissolving the support film. More preferably, the difference in the boiling point between a solvent having a highest boiling point out of the solvents capable of dissolving the support film and a solvent having a highest boiling point out of the solvents incapable of dissolving the support film is 30° C. or more. This difference is most preferably 40° C. or more.

The mass ratio (A/B) between the total amount (A) of the solvents capable of dissolving the transparent support film and the total amount (B) of the solvents incapable of dissolving the transparent support film is preferably from 5/95 to 50/50, more preferably from 10/90 to 40/60, still more preferably from 15/85 to 30/70.

[Support]

The support of the film of the present invention may be a transparent resin film, a transparent resin plate, a transparent resin sheet, a transparent glass or the like and is not particularly limited. Examples of the transparent resin film include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film, a (meth) acrylnitrile film, a polyolefin, and a polymer having an alicyclic structure [norbornene-based resin {"ARTON" (trade name) produced by JSR Corp.}, noncrystalline polyolefin {"ZEONEX" (trade name) produced by ZEON Corp.}). Among these, triacetyl cellulose, polyethylene terephthalate and a polymer having an alicyclic structure are preferred, and triacetyl cellulose is more preferred.

A support having a thickness of approximately from 25 to 1,000 μm may be usually used, but the thickness is preferably from 25 to 250 μm, more preferably from 30 to 90 μm.

A support having an arbitrary width may be used but in view of handling, yield ratio and productivity, the width is usually from 100 to 5,000 mm, preferably from 800 to 3,000 mm, more preferably from 1,000 to 2,000 mm. The support can be handled as a lengthy support in a roll form, and the length is usually from 100 to 5,000 m, preferably from 500 to 3,000 m.

The surface of the support is preferably smooth, and the average roughness Ra value is preferably 1 μm or less, more preferably from 0.0001 to 0.5 μm, still more preferably from 0.001 to 0.1 μm.

[Cellulose Acylate Film]

Among those various films, a cellulose acylate film assured of high transparency, less optical birefringence and easy production and generally used as a polarizing plate protective film is preferred.

As regards the cellulose acylate film, various techniques for improving mechanical property, transparency, planarity and the like are known, and the technique described in *JIII Journal of Technical Disclosure*, No. 2001-1745 can be used as a known art for the film of the present invention.

<Usage of Light-Scattering Film>

[Polarizing Plate]

The light-scattering film of the present invention can be used as a protective film disposed on one side or both sides of a polarizing film and used as a polarizing plate. While using the light-scattering film of the present invention for one protective film, a normal cellulose acetate film may be used for another protective film, but a cellulose acetate film produced by a solution film-forming method and stretched in the width direction of the film in a roll form at a stretch ratio of 10 to 100% is preferably used.

Furthermore, in the polarizing plate of the present invention, it is preferred that one surface is the light-scattering film and the other protective film is an optically compensatory film having an optically anisotropic layer comprising a liquid crystalline compound. The optically compensatory film (phase difference film) can improve the viewing angle characteristics on the liquid crystal display screen. A known optically compensatory film may be used but from the standpoint of enlarging the viewing angle, the optically compensatory film described in JP-A-2001-100042 is preferred.

The polarizing film includes an iodine-based polarizing film, a dye-based polarizing film using a dichroic dye, and a polyene-based polarizing film. The iodine-based polarizing film and the dye-based polarizing film are generally produced using a polyvinyl alcohol-based film.

The slow axis of the transparent support or cellulose acetate film of the antireflection film and the transmission axis of the polarizing film are arranged to run substantially in parallel.

The moisture permeability of the protective film is important for the productivity of the polarizing plate. The polarizing film and the protective film are laminated with an aqueous adhesive, and the solvent of this adhesive diffuses in the protective film and is thereby dried. As the moisture permeability of the protective film is higher, the drying rate and in turn the productivity are more elevated, but if the moisture permeability is excessively high, moisture enters into the polarizing film depending on the environment (at high humidity) where the liquid crystal display device is used, and the polarizing ability decreases.

The moisture permeability of the protective film is determined, for example, by the thickness of transparent support or polymer film (and polymerizable liquid crystal compound), the free volume or the hydrophilicity/hydrophobicity. In the case of using the film of the present invention as a protective film of the polarizing plate, the moisture permeability is preferably from 100 to 1,000 g/m$^2$•24 hrs, more preferably from 300 to 700 g/m$^2$•24 hrs.

The polarizing film may be a known polarizing film or a polarizing film cut out from a lengthy polarizing film with the absorption axis of the polarizing film being neither parallel nor perpendicular to the longitudinal direction. The lengthy polarizing film with the absorption axis of the polarizing film being neither parallel nor perpendicular to the longitudinal direction is produced by the following method.

This is a polarizing film stretched by applying a tension to a continuously fed polymer film while holding its both edges with holding means and can be produced by a stretching method of stretching the film to 1.1 to 20.0 times at least in the film width direction and bending the film travelling direction in the state of the film being held at both edges, where the difference in the travelling speed in the longitudinal direction between the holding devices at both edges of the film is within 3%, such that the angle made by the film travelling direction at the outlet in the step of holding both edges of the film and the substantial stretching direction of the film is inclined at 20 to 70°. Particularly, a polarizing film produced with an inclination angle of 45° is preferred in view of productivity.

[Liquid Crystal Display Device]

The light-diffusing film and/or polarizing plate of the present invention can be advantageously used for an image display device such as liquid crystal display and is preferably used as the outermost surface layer of the display.

The liquid crystal display device comprises a liquid crystal cell and two polarizing plates disposed on both sides thereof, and the liquid crystal cell carries a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal cell includes TN mode, VA mode, OCB mode, IPS mode and ECB mode, but as described above, the light-scattering film of the present invention can exert a great effect of improving the viewing angle characteristics in the TN mode or OCB mode.

[TN Mode]

In the TN-mode liquid crystal cell, rod-like liquid crystalline molecules are oriented substantially in the horizontal alignment at the time of not applying a voltage and furthermore, twisted at an angle of 60 to 120°. The TN-mode liquid crystal cell is most frequently utilized as a color TFT liquid crystal display device and is described in many publications.

[OCB Mode]

The OCB-mode liquid crystal cell is a liquid crystal cell of bend alignment mode where rod-like liquid crystalline molecules are oriented substantially in the reverse direction (symmetrically) between upper portion and lower portion of the liquid crystal cell, and this is disclosed in U.S. Pat. Nos. 4,583,825 and 5,410,422. Since rod-like liquid crystalline molecules are symmetrically oriented between upper portion and lower portion of the liquid crystal cell, the liquid crystal cell of bend alignment mode has an optically self-compensating ability. Accordingly, this liquid crystal mode is called an OCB (optically compensatory bend) liquid crystal mode. The liquid crystal display device of bend alignment mode is advantageous in that the response speed is fast.

The construction of the OCB-mode liquid crystal display device, and the optically anisotropic layer, cellulose-based protective film, polarizing film, color filter and the like which can be used therefor are described in detail in JP-A-2006-259003.

In recent years, movement to growth in size of the liquid crystal display device is prominent. Along with growth in size, the viewing angle characteristics of the liquid crystal display device come to have a great effect on the comfort perceived by a user. The viewing-angle asymmetry of the TN-mode or OCB-mode liquid crystal display device is improved by mounting a light-scattering film and therefore, the light-scattering film of the present invention is preferably used particularly for a large-screen display device of 26 inches or more.

(Effect of Light-Scattering Film on OCB Mode and TN Mode)

The light-scattering film of the present invention is preferably used for OCB mode and TN mode. Among the liquid crystal displays, the OCB mode is particularly a display mode improved in the response speed. The OCB-mode liquid crystal display device is, however, poor in terms of the viewing-angle brightness asymmetry at an oblique 45° direction due to its liquid crystal alignment. The light-scattering film of the present invention isotropically scatters the transmitted light of the display and at the same time, evenly scatters the color component to the peripheral corners, so that the viewing-angle brightness asymmetry can be reduced without involving change in the color tint.

The TN mode is a liquid crystal display mode developed in the initial stage and is inexpensive but has a serious problem of tone reversal in the up/down direction. For reducing the tone reversal, a method of mounting a viewing angle compensating film is generally employed (see, for example, JP-A-2004-233872), but in order to supplement the effect of the viewing angle compensating film, it is more effective to utilize the above-described characteristics in the present invention.

(Effect of Light-Scattering Film on Large-Screen Display Device)

The light-scattering film of the present invention is preferably used for a liquid crystal display device having a panel size of 26 inches or more. In the case of using a large-screen display device at the same distance as that on use of a conventional display device, the viewing angle region in the right/left direction for looking over screen from end to end increases. Therefore, when using a large-screen display device, the visual asymmetry of the display device appears more prominently than in conventional display devices.

Also, along with the increase in the screen size and reduction in the thickness of the display device, the method of disposing a liquid display device is diversified. Accordingly, the viewing angle asymmetry not only in the right/left direction but also in the up/down direction needs to be improved. The problem of viewing-angle brightness asymmetry is significant particularly in the OCB-mode or TN-mode liquid crystal display device as compared with other liquid crystal display modes. The light-scattering film of the present invention can reduce the viewing-angle brightness asymmetry without involving change in the color tint by isotropically scattering the transmitted light of the display and at the same time, evenly scattering the color component to the peripheral corners and therefore, is suitably used for the above-described large-screen display device. The light-scattering film of the present invention is preferably used for a liquid crystal display device having a panel size of 26 inches or more, more preferably for a liquid crystal display device having a panel size of 32 inches or more, still more preferably for a liquid crystal display device having a panel size of 37 inches or more.

EXAMPLES

The present invention is described in greater detail below by referring to Examples, but the present invention should not be construed as being limited thereto. Unless otherwise indicated, the "parts" and "%" are on the mass basis.
[Preparation of Coating Solution for Each Layer]
[Preparation of Coating Solution for Light-Scattering Layer]
{Preparation of Coating Solution (DL-1) for Light-Scattering Layer}

100 Parts by mass of aromatic urethane acrylate "EB-220" {produced by Daicel Chemical Industries, Ltd.} as the light-transparent resin constituting the light-scattering layer, 9 parts by mass of melamine resin particle "OPTBEADS 2000M" {particle diameter: 1.5 μm, produced by Nissan Chemical Industries, Ltd.} as the light-transparent particle, and 6 parts by mass of "Irgacure 184" {produced by Ciba Specialty Chemicals Corp.} as the polymerization initiator are mixed and adjusted with methyl ethyl ketone/methyl isobutyl ketone (30/70 by mass) to a solid content of 50%.
{Preparation of Coating Solution (DL-2) for Light-Scattering Layer}

100 Parts by mass of aliphatic urethane acrylate "UN-904" {produced by Negami Chemical Industrial Co., Ltd.} as the light-transparent resin constituting the light-scattering layer, 9 parts by mass of melamine resin particle "OPTBEADS 2000M" as the light-transparent particle, and 6 parts by mass of "Irgacure 184" as the polymerization initiator are mixed and adjusted with methyl ethyl ketone/methyl isobutyl ketone (30/70 by mass) to a solid content of 50%.
{Preparation of Coating Solution (DL-3) for Light-Scattering Layer}

100 Parts by mass of dipentaerythritol hexaacrylate {produced by Nippon Kayaku Co., Ltd.} as the light-transparent resin constituting the light-scattering layer, 9 parts by mass of melamine resin particle "OPTBEADS 2000M" as the light-transparent particle, and 6 parts by mass of "Irgacure 184" as the polymerization initiator are mixed and adjusted with methyl ethyl ketone/methyl isobutyl ketone (30/70 by mass) to a solid content of 50%.
(Preparation of Light-Transparent Particle 1)

1.0 Parts by mass of "KBM-5103" (produced by Shin-Etsu Chemical Co., Ltd.), 0.05 parts by mass of diisopropoxyaluminum ethyl acetate, 0.3 parts by mass of distilled water and 22.0 parts by mass of ethyl acetate are added to 10 parts by mass of a zirconia particle (produced according to the method in Example 1 of JP-A-2007-119617) and mixed to surface-modify the zirconia particle surface. Thereafter, a dispersing treatment is performed to obtain a zirconia liquid dispersion (zirconia concentration: 30 mass %).

600 Parts by mass of water is filled in a reactor equipped with a stirrer and a reflux condenser, and 0.7 parts by mass of polyvinyl alcohol and 2.7 parts by mass of sodium dodecylbenzenesulfonate are added thereto and dissolved. Subsequently, Particle-Forming Mixture 1 (containing 205 parts by mass of the zirconia liquid dispersion prepared above, 32.4 parts by mass of dipentaerythritol hexaacrylate {produced by Nippon Kayaku Co., Ltd.} and 1.5 parts by mass of benzoyl peroxide) is added, followed by stirring. This mixed solution is uniformly dispersed by using a homogenizer at 5,000 rpm for 15 minutes, and the stirring is continued at 75° C. for 4 hours while blowing a nitrogen gas. Thereafter, the product is lightly dehydrated, then washed with water and dried. The average particle diameter of the obtained Light-Transparent Particle 1 is 1.5 μm.
{Preparation of Coating Solution (DL-4) for Light-Scattering Layer}

100 Parts by mass of aliphatic urethane acrylate "UN-904" {produced by Negami Chemical Industrial Co., Ltd.} as the light-transparent resin constituting the light-scattering layer, 9 parts by mass of Light-Transparent Particle 1 as the light-transparent particle, and 6 parts by mass of "Irgacure 184" as the polymerization initiator are mixed, and the solid content of the mixture is adjusted with methyl ethyl ketone/methyl isobutyl ketone (30/70 by mass) to 50%.
[Preparation of Coating Solution for Low Refractive Index Layer]
(Preparation of Sol Solution a)

In a reaction vessel equipped with a stirrer and a reflux condenser, 120 parts of methyl ethyl ketone, 100 parts of acryloyloxypropyltrimethoxysilane "KBM-5103" {produced by Shin-Etsu Chemical Co., Ltd.} and 3 parts of diisopropoxyaluminum ethyl acetate are added and mixed and after adding 30 parts of ion-exchanged water, the reaction is allowed to proceed at 60° C. for 4 hours. The reaction solution is then cooled to room temperature to obtain Sol Solution a. The mass average molecular weight is found to be 1,600 and out of the oligomer or higher components, the proportion of the components having a molecular weight of 1,000 to 20,000 is found to be 100%. Also, from the gas chromatography analysis, it is revealed that the raw material acryloyloxypropyltrimethoxysilane does not remain at all.
(Preparation of Liquid Dispersion A)

30 Parts by mass of "KBM-5103" (produced by Shin-Etsu Chemical Co., Ltd.) and 1.5 parts by mass of diisopropoxyaluminum ethyl acetate are added to 500 parts by mass of a hollow silica fine particle sol (isopropyl alcohol silica sol, average particle diameter: 60 nm, thickness of shell: 10 nm, silica concentration: 20 mass %, refractive index of silica particle: 1.31, prepared according to Preparation Example 4 of JP-A-2002-79616 by changing the size) and mixed, and 9 parts by mass of ion-exchanged water is added thereto. After allowing the reaction to proceed at 60° C. for 8 hours, the reaction solution is cooled to room temperature, and 1.8 parts by mass of acetyl acetone is added. While adding cyclohexanone to 500 parts by mass of the obtained liquid dispersion to keep almost constant the silica content, solvent replacement by reduced-pressure distillation is performed. Foreign matters are not generated in the liquid dispersion, and the concentration of solid contents is adjusted to 20 mass % with cyclohexanone. In this way, Liquid Dispersion A is prepared.
{Preparation of Coating Solution (Ln-1) for Low Refractive Index Layer}

45.0 Parts by mass as the solid content of a fluorine-containing polymer containing an ethylenically unsaturated group {Fluorine Polymer (A-1) described in Production Example 3 of JP-A-2005-89536} is dissolved in 500 parts by mass of methyl isobutyl ketone, and 195 parts by mass (39.0 parts by mass as the solid content of silica+surface treating agent) of Liquid Dispersion A, 30.0 parts by mass (9.0 parts by mass as the solid content) of colloidal silica dispersion {silica, differing in the particle size from "MEK-ST", average particle diameter: 45 nm, concentration of solid contents: 30 mass %, produced by Nissan Chemical Industries, Ltd.}, 17.0 parts by mass (5.0 parts by mass as the solid content) of Sol Solution a, and 2.0 parts by mass of photopolymerization initiator "PM980M" {Wako Pure Chemicals Industries, Ltd.} are added thereto. The obtained solution is diluted with methyl ethyl ketone such that the concentration of solid contents of the entire coating solution becomes 6 mass %. In this way, Coating Solution (Ln-1) for Low Refractive Index Layer is prepared.

Example 1

[Production of Light-Scattering Film]
{Production of Light-Scattering Film (101)}

On triacetyl cellulose film "TD-80U" {produced by Fujifilm Corp.} as the support, Coating Solution (DL-1) for Light-Scattering Layer is coated to a dry thickness of 5.0 μm. After drying the solvent, the coating layer is cured by irradiating an ultraviolet ray at an illuminance of 1.5 kW/cm² and an irradiation dose of 95 mJ/cm² with use of "Air-Cooled Metal Halide Lamp" {manufactured by Eye Graphics Co., Ltd.} of 160 W/cm to produce Light-Scattering Film (101).

{Production of Light-Scattering Film (102)}

Light-Scattering Film (102) is produced in the same manner as in the production of Light-Scattering Film (101) except that in the production of Light-Scattering Film (101), Coating Solution (DL-2) for Light-Scattering Layer is used in place of Coating Solution (DL-1) for Light-Scattering Layer.

{Production of Light-Scattering Film (103)}

Light-Scattering Film (103) is produced in the same manner as in the production of Light-Scattering Film (101) except that in the production of Light-Scattering Film (101), Coating Solution (DL-3) for Light-Scattering Layer is used in place of Coating Solution (DL-1) for Light-Scattering Layer.

{Production of Light-Scattering Film (107)}

Light-Scattering Film (107) is produced in the same manner as Light-Scattering Film (101) except for using Coating Solution (DL-4) for Light-Scattering Layer in place of Coating Solution (DL-1) for Light-Scattering Layer in the production of Light-Scattering Film (101).

[Production of Liquid Crystal Display Device and Polarizing Plate Used Therefor]

[Production of Polarizing Plate]
{Production of Optically Compensatory Film}
(Preparation of Cellulose Acetate Solution)

80 Parts by mass of cellulose acetate (linter) having an acetylation degree of 60.9%, 20 parts by mass of cellulose acetate (linter) having an acetylation degree of 60.8%, 7.8 parts by mass of triphenyl phosphate, 3.9 parts by mass of biphenyl diphenyl phosphate, 300 parts by mass of methylene chloride, and 45 parts by mass of methanol are charged in this order into a mixing tank, and respective components are dissolved with stirring under heating to prepare a cellulose acetate solution.

(Preparation of Retardation Raising Agent Solution)

4 Parts by mass of cellulose acetate (linter) having an acetylation degree of 60.9%, 25 parts by mass of the retardation raising agent shown blow, 0.5 parts by mass of silica fine particle (average particle diameter: 20 nm), 80 parts by mass of methylene chloride, and 20 parts by mass of methanol are charged in this order into a separate mixing tank, and the mixture is stirred under heating to prepare a retardation raising agent solution.

(Retardation Raising Agent)

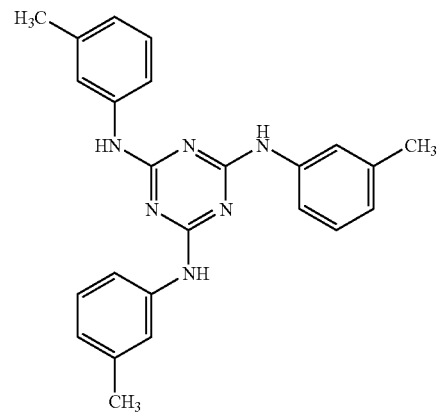

(Production of Cellulose Acetate Film A)

30 Parts by mass of the retardation raising agent solution above is mixed with 470 parts by mass of the cellulose acetate solution, and the mixture is thoroughly stirred to prepare a dope. The amount of the retardation raising agent added is 6.2 parts by mass per 100 parts by mass of cellulose acetate.

The obtained dope is cast using a band casting machine, and the film is dried on the band for 1 minute after the film surface temperature becomes 35° C., separated when the residual solvent amount is 45 mass %, stretched in a tenter stretching zone to a stretch ratio of 28% in the width direction in an atmosphere at a temperature of 140° C., and then dried at 140° C. for 10 minutes and at 130° C. for 20 minutes to produce a cellulose acetate film (thickness: 60 μm) having a residual solvent amount of 0.3 mass %.

The optical properties of the produced cellulose acetate film are measured, as a result, the Re retardation value is 35 nm and the Rth retardation value is 175 nm. Incidentally, as for the optical properties, the Re retardation value and Rth retardation value at a wavelength of 550 nm are measured using "Ellipsometer M-150" {manufactured by JASCO Corp.}.

On the surface of the produced cellulose acetate film, 5 mL/m² of a 1.5N potassium hydroxide solution (solvent: water/isopropyl alcohol/propylene glycol=14/86/15 vol %) is coated and kept at 60° C. for 10 seconds. Thereafter, potassium hydroxide remaining on the film surface is washed with water, and the film is dried. The surface energy of the cellulose acetate film is determined by the contact angle method and found to be 60 mN/m. In this way, Cellulose Acetate Film A for an optically compensatory film serving also as a protective film in a polarizing plate is produced.

(Formation of Optically Anisotropic Layer)
(Preparation of Coating Solution for Orientation Film)

10 Parts by mass of modified polyvinyl alcohol shown below, 371 parts by mass of water, 119 parts by mass of methanol, and 0.5 parts by mass of glutaraldehyde are mixed in this order to prepare a coating solution for orientation film.

(Modified Polyvinyl Alcohol)

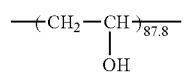

-continued

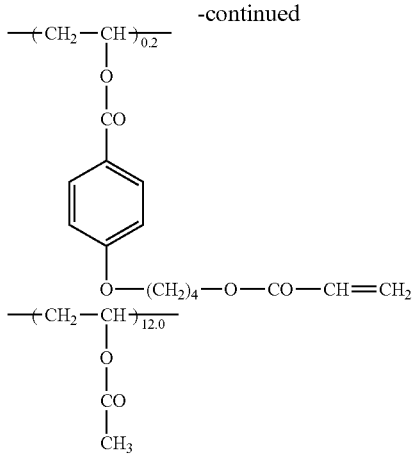

(Formation of Orientation Film)

On Cellulose Acetate Film A, 28 mL/m² of the coating solution for orientation film is coated by a #16 wire bar coater. The film coating is dried with hot air at 60° C. for 60 seconds and further with hot air at 90° C. for 150 seconds. Subsequently, the formed film is subjected to a rubbing treatment in the direction making an angle of 45° with the longitudinal direction of Cellulose Acetate Film A. In this way, an orientation film is provided on Cellulose Acetate Film A used as the support.

(Preparation of Coating Solution for Optically Anisotropic Layer)

102 Parts by mass of methyl ethyl ketone, 41.01 parts by mass of a discotic liquid crystalline compound shown below, 4.06 parts by mass of ethylene oxide-modified trimethylolpropane triacrylate "V360" {produced by Osaka Organic Chemical Industry Ltd.}, 0.68 parts by mass of cellulose acetate butyrate "CAB551-0.2" {produced by Eastman Chemical Co.}, 1.35 parts by mass of photopolymerization initiator "Irgacure 907" {produced by Ciba Specialty Chemicals Corp.}, and 0.45 parts by mass of photosensitizer "Kayacure DETX" {produced by Nippon Kayaku Co., Ltd.} are mixed in this order to prepare a coating solution for optically anisotropic layer.

(Discotic Liquid Crystalline Compound)

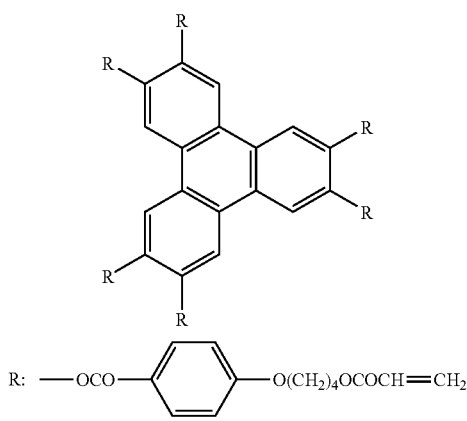

(Coating of Optically Anisotropic Layer)

The coating solution for optically anisotropic layer prepared above is coated on the orientation film by a #4 wire bar, and the coating is heated in a constant temperature zone at 130° C. for 2 minutes to orient the discotic liquid crystalline compound in hybrid alignment. Thereafter, an ultraviolet is irradiated for 0.4 seconds by using a high-pressure mercury lamp of 1,200 Wcm in an atmosphere at 100° C. to polymerize the discotic liquid crystalline compound and thereby fix the alignment. In this way, an optically compensatory film is produced by coating and forming an optically anisotropic layer on Cellulose Acetate Film A.

[Production of Viewing-Side Polarizing Plate for OCB Mode]

{Production of Viewing-Side Polarizing Plate (Pol-1) for OCB Mode}

A polarizing film is produced by adsorbing iodine to a stretched polyvinyl alcohol film. The back surface (the surface opposite the surface where the light-scattering layer is formed) of Light-Scattering Film (101) is saponified and then laminated to one side of the polarizing film by using a polyvinyl alcohol-based adhesive such that the back surface of the light-scattering film comes to the polarizing film side.

Furthermore, the optically compensatory film produced above by coating an optically anisotropic layer is laminate to the polarizing film surface opposite the side where Light-Scattering Film (101) is laminated, by using a polyvinyl alcohol-based adhesive such that Cellulose Acetate Film A comes to the polarizing film side. The transmission axis of the polarizing film and the slow axis of Cellulose Acetate Film A of the optically compensatory film are arranged to run in parallel. In this way, Viewing-Side Polarizing Plate (Pol-1) for OCB mode is produced.

{Production of Viewing-Side Polarizing Plate (Pol-2) for OCB Mode}

Viewing-Side Polarizing Plate (Pol-2) for OCB Mode is produced in the same manner as Polarizing Plate (Pol-1) except that in the production of Viewing-Side Polarizing Plate (Pol-1), Light-Scattering Film (102) is used as the protective film on one side in place of Light-Scattering Film (101).

{Production of Viewing-Side Polarizing Plate (Pol-3) for OCB Mode}

Viewing-Side Polarizing Plate (Pol-3) for OCB Mode is produced in the same manner as Polarizing Plate (Pol-1) except that in the production of Viewing-Side Polarizing Plate (Pol-1), Light-Scattering Film (103) is used as the protective film on one side in place of Light-Scattering Film (101).

{Production of Viewing-Side Polarizing Plate (Pol-7) for OCB Mode}

Viewing-Side Polarizing Plate (Pol-7) for OCB Mode is produced in the same manner as Polarizing Plate (Pol-1) except that as a protective film on one side, Light-Scattering Film (107) is used in place of Light-Scattering Film (101) in the production of Viewing-Side Polarizing Plate (Pol-1).

[Production of Backlight-Side Polarizing Plate]

A polarizing film is produced by adsorbing iodine to a stretched polyvinyl alcohol film. The optically compensatory film produced above by providing an optically anisotropic layer is laminated to one side of the polarizing film by using a polyvinyl alcohol-based adhesive such that Cellulose Acetate Film A comes to the polarizing film side. The transmission axis of the polarizing film and the slow axis of Cellulose Acetate Film A of the optically compensatory film are arranged to run in parallel. Also, a commercially available triacetate film "TD80-UF" {produced by Fujifilm Corp.} is saponified and laminated to the polarizing film surface opposite the side where the optically anisotropic film is laminated. In this way, a backlight-side polarizing plate is produced.

[Production of Liquid Crystal Display Device]

[Production of OCB-Mode Liquid Crystal Display Device (201)]

A polyimide film as an orientation film is provided on a glass substrate with an ITO electrode, and the orientation film is subjected to a rubbing treatment. Two glass substrates obtained are disposed to face each other by arranging the rubbing directions in parallel, and the cell gap is set to be 6 µm. A liquid crystalline compound "ZLI1132" (produced by Merck Ltd.) having Δn of 0.1396 is injected into the cell gap to produce an OCB-mode liquid crystal cell. Viewing-Side Polarizing Plate (Pol-1) is laminated to the OCB-mode liquid crystal cell produced, and the backlight-side polarizing plate is laminated to the opposite side. These polarizing plates are arranged such that the optically anisotropic layer of the viewing-side polarizing pate faces the cell substrate and the rubbing direction of the liquid crystal cell becomes antiparallel to the rubbing direction of the optically anisotropic layer facing the liquid crystal cell. Furthermore, a backlight device is installed to produce Liquid Crystal Display Device (201).

[Production of OCB-Mode Liquid Crystal Display Device (202)]

OCB-Mode Liquid Crystal Display Device (202) is produced in the same manner as Liquid Crystal Display Device (201) except for using Viewing-Side Polarizing Plate (Pol-2) in place of Viewing-Side Polarizing Plate (Pol-1) in the production of Liquid Crystal Display Device (201).

[Production of OCB-Mode Liquid Crystal Display Device (203)]

OCB-Mode Liquid Crystal Display Device (203) is produced in the same manner as Liquid Crystal Display Device (201) except for using Viewing-Side Polarizing Plate (Pol-3) in place of Viewing-Side Polarizing Plate (Pol-1) in the production of Liquid Crystal Display Device (201).

[Production of OCB-Mode Liquid Crystal Display Device (207)]

OCB-Mode Liquid Crystal Display Device (207) is produced in the same manner as Liquid Crystal Display Device (201) except for using Viewing-Side Polarizing Plate (Pol-7) in place of Viewing-Side Polarizing Plate (Pol-1) in the production of Liquid Crystal Display Device (201).

[Production of OCB-Mode Liquid Crystal Display Device (210)]

OCB-Mode Liquid Crystal Display Device (210) is produced in the same manner as Liquid Crystal Display Device (201) except for using a commercially available cellulose triacetate film "TD80-UF" subjected to saponification in place of Viewing-Side Polarizing Plate (Pol-1) in the production of Liquid Crystal Display Device (201).

Using the thus-obtained light-scattering films and liquid crystal display devices, the following evaluations are performed.

[Evaluation of Light-Scattering Film]

[Evaluation 1: Measurement of Refractive Index of Light-Transparent Resin]

The refractive index of the light-transparent resin used for the light-scattering film is measured by the following method.

The light-transparent particle is removed from the coating solution for light scattering, and the solution prepared is coated on a support "TD-80U" {triacetyl cellulose film, produced by Fujifilm Corp.} to have a dry thickness of 5.0 µm and after drying the solvent, the coating layer is cured by irradiating an ultraviolet ray at an illuminance of 1.5 kW/cm$^2$ and an irradiation dose of 95 mJ/cm$^2$ with use of "Air-Cooled Metal Halide Lamp" {manufactured by Eye Graphics Co., Ltd.} of 160 W/cm to obtain a light-transparent resin film. The refractive indexes at wavelengths of 435 nm and 545 nm are measured on each light-transparent resin film and the support by an interference thickness meter "FE-3000" {manufactured by Otsuka Electronics Co., Ltd.}.

[Evaluation 2: Measurement of Refractive Index of Light-Transparent Particle]

Melamine Resin Particle

In a 2 L-volume reaction flask equipped with a stirrer, a reflux condenser and a thermometer, 80.0 parts by mass of melamine, 154.4 parts by mass of 37% formalin, 1.0 part by mass of sodium sulfate, and 683 parts by mass of water are charged, and the pH is adjusted to 8.5 with aqueous 25% ammonia. Thereafter, the temperature is elevated while stirring the mixture, and the reaction is allowed to proceed for 30 minutes by keeping a temperature of 70° C. to prepare an aqueous solution of the initial condensate of melamine resin. While keeping the temperature at 70° C., a 10 mass % aqueous solution of para-toluenesulfonic acid monohydrate is added to the obtained aqueous solution of initial condensate, and the pH is adjusted to 5.1. The thus-obtained solution is coated on a slide glass, the solvent is dried and after elevating the temperature to 90° C., the curing reaction is continued for 3 hours. The refractive indexes at 435 nm and 545 nm are measured on the obtained light-transparent film and the support by an interference thickness meter "FE-3000" {manufactured by Otsuka Electronics Co., Ltd.}.

Zirconia-Containing Light-Transparent Particle 1

Particle-Forming Mixture 1 used in the preparation of Light-Transparent Particle 1 is diluted with methyl isobutyl ketone to adjust the concentration to 30 mass % and coated on a slide glass. After drying the solvent, the coating is cured at a temperature of 70° C. for 10 minutes in a nitrogen atmosphere. The obtained light-transparent film and the support are measured for the refractive index at 435 nm and 545 nm by an interference thickness meter "FE-3000" {manufactured by Otsuka Electronics Co., Ltd.}.

[Evaluation 3: Measurement of Spectral Transmittance of Light-Scattering Film]

The light transmission spectra at wavelengths of 435 nm and 545 nm of each of Light-Scattering Films are measured by a UV-visible light spectrophotometer "UV-3150" {manufactured by Shimadzu Corp.}.

[Evaluation 4: Measurement of Haze of Light-Scattering Film]

The haze value of each of Light-Scattering Films is measured according to JIS K-7136 by using a measuring device "HR-100" {manufactured by Murakami Color Research Laboratory Co., Ltd.}.

The light-scattering layer and construction of the obtained light-scattering film and the evaluation results thereof are shown in Table 1.

In Table 1, the abbreviations indicate the following substances.

OPB:
Melamine resin particle "OPTBEADS 200M", particle diameter: 1.5 μm, produced by Nissan Chemical Industries, Ltd.

EB-220:
Aromatic urethane acrylate "EB-220", produced by Daicel Chemical Industries, Ltd.

UN-904:
Aliphatic urethane acrylate "UN-904", produced by Negami Chemical Industrial Co., Ltd.

DPHA:
Dipentaerythritol hexaacrylate, produced by Nippon Kayaku Co., Ltd.

Also, a middle-tone voltage of 3 V is applied, and the color tint of an image viewed at a right/left viewing angle of 45° is measured by the Lu'v' color system. The change in color tint (Δu'v') of transmitted light from the position at a polar angle of 60° and an azimuthal angle of 45° to the position at a polar angle of 60° and an azimuthal angle of 135° (u'2, v'2) is calculated according to the following mathematical formula (6). Here, it is assumed that the coordinates on the u'v' chromaticity diagram of transmitted light at the position of a polar angle of 60° and an azimuthal angle of 45° are (u'1, v'1) and the coordinates on the u'v' chromaticity diagram of transmitted light at the position of a polar angle of 60° and an azimuthal angle of 135° are (u'2, v'2). The evaluation results are shown in Table 2.

$$\Delta u'v' = \sqrt{[(u'2-u'1)^2 + (v'2-v'1)^2]} \qquad \text{Mathematical Formula (6)}$$

A smaller Δu'v' value is more preferred. When this value is 0.02 or less, change of color tint is scarcely perceived with an eye; when from 0.02 to 0.03, a significant difference is recognized in the change of color tint; and when 0.03 or more, serious change of color tint is recognized.

TABLE 1

| | | | | | | | | | | | | | |
|---|---|---|---|---|---|---|---|---|---|---|---|---|---|
| | | Light-Scattering Film | | | | | | | | | | | |
| | | Coating Solution for Light-Scattering Layer | | | | | | | | Spectral Transmittance | | | |
| | | Light-Scattering Particle | | | Light-Transparent Resin | | | | | | | | |
| | | | Refractive Index $(n_P)$ (°) | | | Refractive Index $(n_P)$ (°) | | | | (T) (%) | | | |
| Sample | | | | | | | | $n_{B435}/n_{B545}$ | $(n_{P435}/n_{B435})/(n_{P545}/n_{B545})$ | | | $T_{435}/T_{545}$ | Haze |
| No. | No. | Kind | $n_{P435}$ | $n_{P545}$ | Kind | $n_{B435}$ | $n_{B545}$ | | | $T_{435}$ | $T_{545}$ | | (%) |
| Invention | 101 | DL-1 OPB | 1.681 | 1.664 | EB-220 | 1.583 | 1.529 | 1.035 | 0.976 | 44.8 | 53.7 | 0.83 | 45.6 |
| Invention | 102 | DL-2 " | 1.681 | 1.664 | UN-904 | 1.528 | 1.519 | 1.007 | 1.004 | 32.7 | 46.7 | 0.70 | 51.8 |
| Comparative Example | 103 | DL-3 " | 1.681 | 1.664 | DPHA | 1.527 | 1.521 | 1.004 | 1.006 | 21.8 | 71.9 | 0.30 | 50.0 |
| Invention | 107 | DL-4 Particle 1 | 1.681 | 1.665 | UN-904 | 1.528 | 1.519 | 1.007 | 1.003 | 32.7 | 44.8 | 0.73 | 51.0 |

[Evaluation of Image Display Device]

[Evaluation 5: Contrast, Viewing Angle and Viewing-Angle Color Change of Image Display Device]

A rectangular wave voltage of 55 Hz is applied to the liquid crystal cell. The mode is a normally white mode with white display of 2 V and black display of 5 V. Taking the transmittance ratio (white display/black display) as the contrast ratio, the contrast is measured in 8 stages from black display (L1) to white display (L8) by a measuring device "EZ-Contrast 160D" {manufactured by ELDIM Co.}. The viewing angles in the up/down direction and the right/left direction giving a contrast of 10 or more are determined.

TABLE 2

| | Liquid Crystal Display Device | | | | | | |
|---|---|---|---|---|---|---|---|
| | | | | | Characteristic Value | | |
| | Viewing-Side Polarizing Plate | | | Up/Down | Right/Left | | |
| | Sample No. | Size | Sample No. | Light-Scattering Film Sample No. | Viewing Angle (°) | Viewing Angle (°) | Front Contrast | Change of Color Tint Δu'v' |
| Invention | 201 | 26 | Pol-1 | 101 | up to 80 | up to 85 | 382 | 0.014 |
| Invention | 202 | 26 | Pol-2 | 102 | up to 80 | up to 85 | 379 | 0.015 |
| Comparative Example | 203 | 26 | Pol-3 | 103 | up to 80 | up to 85 | 313 | 0.023 |
| Invention | 207 | 26 | Pol-7 | 107 | up to 80 | up to 85 | 379 | 0.014 |
| Comparative Example | 210 | 26 | | TD80-UF | 72 | 70 | 289 | 0.034 |

It is seen from Table 2 that according to the present invention, a light-scattering film capable of enlarging the viewing angle and reducing the viewing-angle dependency of color tint is obtained. In particular, when the light-transparent resin is formed using a curable compound having a urethane bond or a curable compound having an aromatic ring, the viewing-angle dependency of color tint can be reduced.

Example 2

[Production of Light-Scattering Antireflection Film]
[Production of Light-Scattering Antireflection Film (104)]

Coating Solution (Ln-1) for Low Refractive Index Layer is coated on Light-Scattering Film (101) to have a thickness of 95 nm after drying and curing. After drying the solvent, the low refractive index layer is cured by irradiating an ultraviolet ray at an illuminance of 1.5 kW/cm$^2$ and an irradiation dose of 500 mJ/cm$^2$ with use of "Air-Cooled Metal Halide Lamp" {manufactured by Eye Graphics Co., Ltd.} of 160 W/cm while purging the system with nitrogen to an oxygen concentration of about 100 ppm, whereby Light-Scattering Antireflection Film (104) is obtained.

[Production of Light-Scattering Antireflection Film (105)]

Light-Scattering Antireflection Film (105) is obtained in the same manner as Light-Scattering Antireflection Film (104) except for using Light-Scattering Film (102) in place of using Light-Scattering Film (101) in the production of Light-Scattering Antireflection Film 104.

[Production of Light-Scattering Antireflection Film (106)]

Light-Scattering Antireflection Film (106) is obtained in the same manner as Light-Scattering Antireflection Film (104) except for using Light-Scattering Film (103) in place of using Light-Scattering Film (101) in the production of Light-Scattering Antireflection Film 104.

[Production of Polarizing Plate]
[Production of Viewing-Side Polarizing Plate (Pol-4) for OCB Mode]

Viewing-Side Polarizing Plate (Pol-4) is produced in the same manner as Viewing-Side Polarizing Plate (Pol-1) except for using Light-Scattering Film (104) in place of using Light-Scattering Film (101) in the production of Viewing-Side Polarizing Plate (Pol-1) for OCB Mode.

[Production of Viewing-Side Polarizing Plate (Pol-5) for OCB Mode]

Viewing-Side Polarizing Plate (Pol-5) is produced in the same manner as Viewing-Side Polarizing Plate (Pol-1) except for using Light-Scattering Film (105) in place of using Light-Scattering Film (101) in the production of Viewing-Side Polarizing Plate (Pol-1) for OCB Mode.

[Production of Viewing-Side Polarizing Plate (Pol-6) for OCB Mode]

Viewing-Side Polarizing Plate (Pol-6) is produced in the same manner as Viewing-Side Polarizing Plate (Pol-1) except for using Light-Scattering Film (106) in place of using Light-Scattering Film (101) in the production of Viewing-Side Polarizing Plate (Pol-1) for OCB Mode.

[Production of Liquid Crystal Display Device]
[Production of OCB-Mode Liquid Crystal Display Device (204)]

OCB-Mode Liquid Crystal Display Device (204) is produced in the same manner as Liquid Crystal Display Device (201) except for using Viewing-Side Polarizing Plate (Pol-4) for OCB Mode in place of using Viewing-Side Polarizing Plate (Pol-1) for OCB Mode in the production of OCB-Mode Liquid Crystal Display Device (201).

[Production of OCB-Mode Liquid Crystal Display Device (205)]

OCB-Mode Liquid Crystal Display Device (205) is produced in the same manner as Liquid Crystal Display Device (201) except for using Viewing-Side Polarizing Plate (Pol-5) for OCB Mode in place of Viewing-Side Polarizing Plate (Pol-1) for OCB Mode in the production of OCB-Mode Liquid Crystal Display Device (201).

[Production of OCB-Mode Liquid Crystal Display Device (206)]

OCB-Mode Liquid Crystal Display Device (206) is produced in the same manner as Liquid Crystal Display Device (201) except for using Viewing-Side Polarizing Plate (Pol-6) for OCB Mode in place of Viewing-Side Polarizing Plate (Pol-1) for OCB Mode in the production of OCB-Mode Liquid Crystal Display Device (201).

Image Display Devices (204) to (206) are evaluated in accordance with Example 1, as a result, almost the same effects are obtained. Enhancement of visibility by virtue of low reflectance is attained. The results are shown in Table 3.

TABLE 3

| | Sample No. | Size | Viewing-Side Polarizing Plate Sample No. | Light-Scattering Antireflection Film Light-Scattering Film Sample No. | Coating Solution for Light-Scattering Layer No. | Coating Solution for Low Refractive Index Layer | Characteristic Value Up/down Viewing Angle (°) | Right/Left Viewing Angle (°) | Front Contrast | Change of Color Tint Δu'v' |
|---|---|---|---|---|---|---|---|---|---|---|
| Invention | 204 | 26 | Pol-4 | 101 | DL-1 | Ln-1 | up to 80 | up to 85 | 428 | 0.013 |
| Invention | 205 | 26 | Pol-5 | 102 | DL-2 | " | up to 80 | up to 85 | 403 | 0.014 |
| Comparative Example | 206 | 26 | Pol-6 | 103 | DL-3 | " | up to 80 | up to 85 | 373 | 0.023 |
| Comparative Example | 210 | 26 | | | TD80-UF | | 72 | 70 | 289 | 0.034 |

Example 3

Using Liquid Crystal Display Devices (204) and (206) of Example 2, image display devices are produced by changing the screen size of the image display device to 20, 22, 26 or 32 inches.

Ten testing panelists are allowed to freely dispose one unit of an image display device in a 8-mat living room and asked to evaluate, envisaging daily handling by each person, the change in the viewing angle dependency of color tint of the liquid crystal display device on the following three-step scale for an image display device equipped with the light-scattering film of the present invention and an image display device not equipped with the light-scattering film.

Point 10: A distinct difference is observed between the present invention and Comparative Example, and the display device of the present invention is apparently superior.

Point 5: A difference is observed between the present invention and Comparative Example, and the display device of the present invention is superior.

Point 3: A difference is recognized between the present invention and Comparative Example, but there is no great difference in the daily handling.

Point 0: Substantially no difference is recognized between the present invention and Comparative Example.

The results obtained by averaging evaluation scores of 10 testing panelists are shown in Table 4.

TABLE 4

| Display Device Size | Evaluation |
|---|---|
| 20 inches | 3.7 |
| 22 inches | 3.9 |
| 26 inches | 7.3 |
| 32 inches | 7.8 |

As seen from Table 4, when the size of the image display device is small, the evaluation of the image display device is not so different between the present invention and Comparative Example, but when the size of the image display device is 26 inches or more, a significant difference is recognized. This is presumed to result because the testing panelists envisaged that a small image display device is placed on a table and observed in many cases in a somewhat fixed position but an image display device in a size exceeding 26 inches is increasingly placed on a low table or a floor case and the viewing angle on observing the display device is enlarged. The liquid crystal television available on the market at present has a weight of about 20 kg for the 26-inch size, and many people seem to consider such a television is too large to place on a table in general.

According to the present invention, a light-scattering film and a polarizing plate, ensuring that in a display having viewing-angle asymmetry, both the brightness asymmetry and the change in color tint are improved over a wide range of viewing angle can be obtained. Also, a TN-mode or OCB-mode image display device equipped with the polarizing plate, particularly, a large-screen display device of 26 inches or more, can be provided.

The entire disclosure of each and every foreign patent application from which the benefit of foreign priority has been claimed in the present application is incorporated herein by reference, as if fully set forth.

What is claimed is:

1. A liquid crystal display device comprising a polarizing plate on an outermost side of the display device,
    wherein the polarizing plate comprises:
        a polarizing film; and
        a light-scattering film as a protective film on one side of the polarizing film, and
    wherein the light-scattering film comprises:
        a support; and
        a layer comprising a light-scattering particle and a light-transparent resin,
    wherein the particle diameter of the light-scattering particle is from 0.5 to 6.0 μm, and
    wherein the light-scattering film satisfies following formulae (1) to (3), (7) and (8) at the same time:

$$n_{B435} < n_{P435} \qquad \text{Mathematical Formula (1)}$$

$$n_{B545} < n_{P545} \qquad \text{Mathematical Formula (2)}$$

$$0.9 < (n_{P435}/n_{B435})/(n_{P545}/n_{B545}) < 1.005 \qquad \text{Mathematical Formula (3)}$$

$$0.02 \leq n_{P435} - n_{B435} \leq 0.20 \qquad \text{Mathematical Formula (7)}$$

$$0.02 \leq n_{P545} - n_{B545} \leq 0.20 \qquad \text{Mathematical Formula (8)}$$

wherein $n_{P435}$ and $n_{P545}$ represent refractive indexes of the light-scattering particle at wavelengths of 435 nm and 545 nm, respectively, and $n_{B435}$ and $n_{B545}$ represent refractive indexes of the light-transparent resin at wavelengths of 435 nm and 545 nm, respectively.

2. The liquid crystal display device of claim 1, wherein the light-scattering film satisfies a following mathematical formula (5):

$$1.005 < n_{B435}/n_{B545} < 1.360. \quad \text{Mathematical Formula (5)}$$

3. The liquid crystal display device of claim 1, wherein the light-scattering film satisfies a following formula (4):

$$0.33 < T_{435}/T_{545} < 1.25 \quad \text{Mathematical Formula (4)}$$

wherein $T_{435}$ and $T_{545}$ represent spectral transmittances at wavelengths of 435 nm and 545 nm, respectively.

4. The liquid crystal display device of claim 1, wherein the light-transparent resin in the light-scattering film comprises an aromatic ring.

5. The liquid crystal display device of claim 4, wherein the light-transparent resin in the light-scattering film is a resin produced by curing a curable resin having an aromatic group in a molecule.

6. The liquid crystal display device of claim 5, wherein the light-transparent resin in the light-scattering film is a resin produced by curing an aromatic group-containing polyfunctional monomer into which an acryloyl group is introduced via a urethane bond.

7. The liquid crystal display device of claim 1, wherein the light-scattering film has a haze value of 15 to 100%.

8. The liquid crystal display device of claim 1, wherein
the light-scattering particle in the light-scattering film comprises a sulfur atom.

9. The liquid crystal display device of claim 1, wherein
the light-scattering particle in the light-scattering film is a metal oxide particle, or
the light-scattering particle is a resin particle comprising a metal oxide particle.

10. The liquid crystal display device of claim 1, comprising:
a TN-mode or OCB-mode liquid crystal cell.

11. The liquid crystal display device of claim 1, which has a panel size of 26 inches or more.

12. The liquid crystal display device of claim 1, wherein the particle size of the light-scattering particle in the light-scattering film is from 0.5 to 3.0 μm and the light-scattering film satisfies the following formula:

$$0.9 < (n_{P435}/n_{B435})/(n_{P545}/n_{B545}) < 1.000.$$

\* \* \* \* \*